(12) United States Patent
Shaw

(10) Patent No.: US 6,719,002 B2
(45) Date of Patent: *Apr. 13, 2004

(54) PRESSURE TESTING APPARATUS FOR GAS SERVICE DELIVERY SYSTEMS

(75) Inventor: Jimmie B. Shaw, Carrollton, MS (US)

(73) Assignee: Presto-Tap, LLC, Cordova, TN (US)

( * ) Notice: Subject to any disclaimer, the term of this patent is extended or adjusted under 35 U.S.C. 154(b) by 172 days.

This patent is subject to a terminal disclaimer.

(21) Appl. No.: 09/843,955

(22) Filed: Apr. 30, 2001

(65) Prior Publication Data

US 2001/0037829 A1 Nov. 8, 2001

Related U.S. Application Data

(63) Continuation-in-part of application No. 09/459,349, filed on Dec. 13, 1999, now Pat. No. 6,223,766, which is a continuation-in-part of application No. 09/296,245, filed on Apr. 22, 1999, now Pat. No. 6,209,560, which is a continuation-in-part of application No. 09/105,264, filed on Jun. 26, 1998, now Pat. No. 5,992,438, which is a continuation-in-part of application No. 08/603,215, filed on Feb. 20, 1996, now Pat. No. 5,787,916.

(51) Int. Cl.$^7$ .............................................. G05D 16/00
(52) U.S. Cl. .................. 137/315.01; 137/557; 137/883; 251/145
(58) Field of Search .................... 137/315.01, 883, 137/557, 613; 251/145, 112

(56) References Cited

U.S. PATENT DOCUMENTS 1,293,753 A * 2/1919 Gibson .................... 251/112
1,885,548 A * 11/1932 Rosenberg ................ 251/112
2,923,312 A    2/1960 Wagner
4,332,273 A    6/1982 Boyce
4,338,793 A    7/1982 O'Hern, Jr.
4,450,721 A    5/1984 Gaunt et al.
4,702,754 A    10/1987 Blocker
5,183,078 A    2/1993 Sorrell

OTHER PUBLICATIONS

Product brochure for G–430 Leak Test Fitting; from Marshall Brass (Div of S.H. Leggitt Co.) ; Marshall, MI.
Product brochure for FLO–LEK Meter; by Koch & Associates, Edmond, Oklahoma.
Product brochure for REGO gauges and valves.

* cited by examiner

Primary Examiner—A. Michael Chambers
(74) Attorney, Agent, or Firm—Larson & Taylor, PLC

(57) ABSTRACT

A gas delivery system for propane or natural gas includes a gas service line, a pressure regulator connected in the gas service line, and a flow control valve device permanently installed at a predetermined location in the gas service line, e.g., upstream of the regulator or downstream of a gas meter in the case of a natural gas system. The flow control valve device includes a valve body incorporating an integral pressure tap for enabling a measurement of gas pressure at the predetermined locations. The valve device also includes a valve operator having an open position in which flow takes place through the valve device and a closed position in which flow through the valve device is blocked and a locking mechanism with a specialized key issued only to service personnel for selectively locking the valve operator in the open and closed positions.

21 Claims, 16 Drawing Sheets

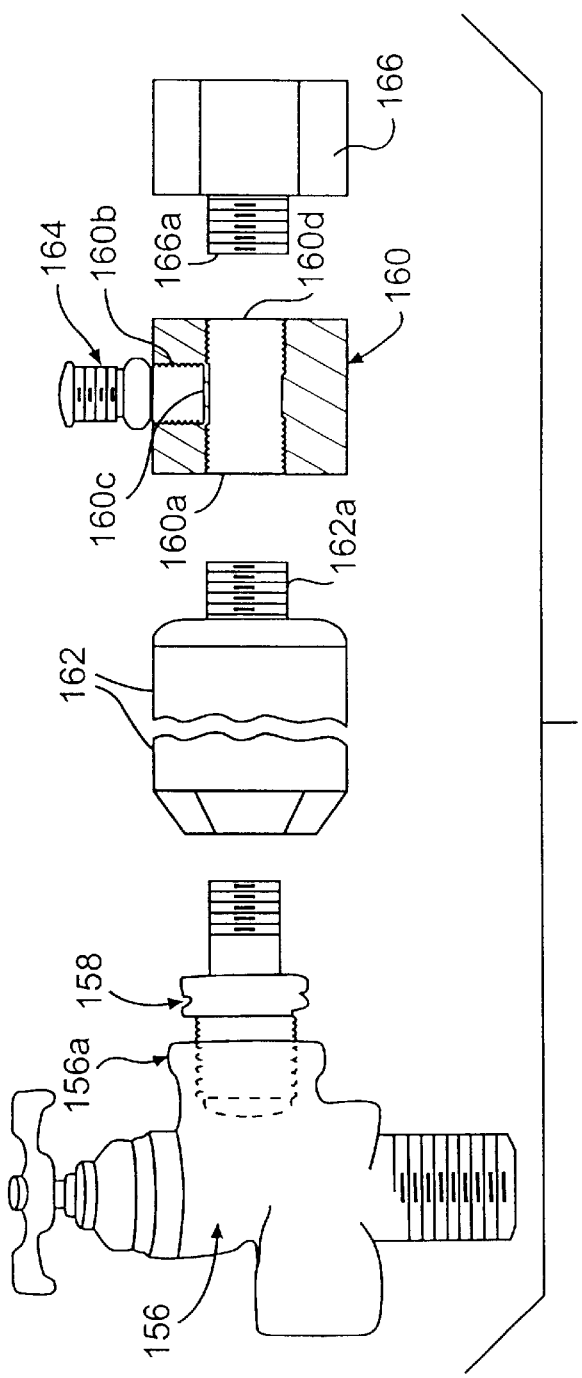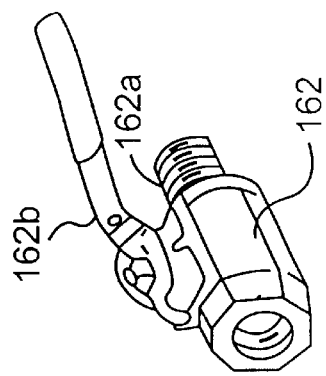
FIG. 16
FIG. 16a

PRESSURE TESTING APPARATUS FOR GAS SERVICE DELIVERY SYSTEMS

CROSS REFERENCE TO RELATED APPLICATIONS

This application is a continuation-in-part of U.S. Ser. No. 09/459,349 filed on Dec. 13, 1999 now U.S. Pat. No. 6,223,766, which is a a continuation-in-part of U.S. Ser. No. 09/296,245, filed on Apr. 22, 1999, now U.S. Pat. No. 6,209,560, which is, in turn, a continuation-in-part of U.S. Ser. No. 09/105,264 filed on Jun. 26,1998, now U.S. Pat. No. 5,992,438, which is, in turn, a continuation-in-part of U.S. Ser. No. 08/603,215, filed on Feb. 20, 1996, now U.S. Pat. No. 5,787,916.

FIELD OF THE INVENTION

The present invention relates to propane tank systems and, more particularly, to gas delivery systems including a valve gas delivery system such as natural gas and arrangement which, among other advantages, enables repair personnel such as a driver-serviceman to readily check for leakage of gas from such systems.

BACKGROUND OF THE INVENTION

Propane gas leaks can obviously cause serious problems. For example, fires resulting from such leaks can cause both property damage and personal injury including, in extreme cases, death. Thus, a very real need exists for an approach in testing for such leaks that will effectively protect the homeowner-users of propane gas. Such protection would also be of substantial benefit to the companies that serve such homeowner-users particularly in the area of reducing the spiraling costs of lawsuits involving the leakage of gas into the home of a customer from the propane system. This leakage is often from appliances that have inadvertently been left on at the time of a gas outage in the propane tank. In any event, whatever the cause of such leakage, it is obviously very important to be able to readily determine when there is leakage from the system.

There are strict rules associated with the assembly and servicing of propane systems. The current rules are set out in NFPA Pamphlet 58. Considering the rules that bear on the issues involved with the present invention, NFPA Pamphlet 58, Section 3-2.10 states that "After assembly, piping systems (including hose) shall be tested and proven free of leaks at not less than operating pressure." Section 4.2.1 states that "Before gas is introduced into a system after being shut off, the entire system shall be inspected to determine that there are no open fittings or ends and all manual valves at outlets on equipment are closed and all unused valves at outlets are closed and plugged or capped." Section 4.2.2 states "Immediately after turning on the gas the piping system shall be tested to ascertain that no gas is escaping." In addition, section 4.3.4 describes the process for purging (emptying of air from) a system that has been opened and states "After the piping has been placed in operation, all equipment shall be purged and then placed in operation as necessary."

Section 4.1.4 of this pamphlet describes the methods of pressure testing and states as follows: "(a) Test pressure shall be measured with a manometer or with a pressure measuring device designed and calibrated to read, record, or indicate a pressure loss due to leakage during the pressure test period. The source of pressure shall be isolated before the pressure tests are made. (b) The test pressure to be used shall be no less than 1 ½ time the proposed maximum working pressure, but not less than 3 psig, irrespective of design pressure. Where the pressure exceeds 125 psig, the test pressure shall not exceed a value that produces a hoop stress in the piping greater than 50 percent of the specified minimum yield strength of the pipe. (c) Systems for undiluted liquefied petroleum gases shall withstand the pressure test in accordance with (b) above, or, for single-staged systems operating at a pressure of ½ psig or less, shall withstand a test pressure of 9.0±½ inch water column for a period of not less than 10 minutes without showing any drop in pressure. If the source of pressure for this test is a liquefied petroleum gas container, the container service valve shall be checked for positive shutoff with leak detector solution prior to the test, or shall be disconnected from the system during the test. (d) Test duration shall be not less than ½ hour for each 500 cubic feet of pipe volume or fraction thereof. When testing a system having a volume less than 10 cubic feet or a system in a single-family dwelling, the test duration shall be permitted to be reduced to 10 minutes. For a piping system having a volume of more than 24,000 cubic feet, the duration of the test shall not be required to exceed 24 hours." Finally, Section 4.1.2 (exception) states that "Fuel gas shall be permitted to be used in piping systems operating at pressures of 0.5 psig."

At present, there is no way for a driver-salesman or a service person, hereinafter referred to for convenience as a repairman or repair personnel, to check for leakage as described above without interrupting the gas piping, a process that is very time consuming. Further, this process introduces unwanted air into the system and thus requires such air to be purged.

There are, of course, many systems which use permanent valves and gauges for determining and/or controlling the pressure in the system. Reference is made in this regard to U.S. Pat. No. 2,923,312 (Wagner), U.S. Pat. No. 4,332,273 (Boyce) and U.S. Pat. No. 4,338,793 (O'Hern, Jr.) relating to refrigeration systems and to U.S. Pat. No. 4,702,754 (Blocker) relating to natural gas or propane delivery systems and U.S. Pat. No. 4,183,078 (Sorrell) relating to a combination shut-off and test-injection valve. Briefly considering some of these patents, the Wagner patent discloses a valve tool for charging and discharging refrigeration systems including a tee-adapter for testing gas pressures. The Boyce patent disclosed a leak-proof connector including a valve of the Schrader (or Schroeder) type while the O'Hern, Jr. patent discloses an adapter for a refrigeration system which also uses a normally closed Schrader valve. The Blocker patent discloses a test adapter which permits pressure tests to be carried out on delivery systems for fuel gas, i.e., propane or natural gas.

Reference is also made to U.S. Pat. No. 5,070,962 (Peterson, Jr.) which discloses a split valve test plug for use in a high pressure pipe line to sense pressure or temperature using a test probe and gauge. The plug valve includes a valve housing which is threaded into a tapped threaded opening in the pipe line.

Although reference is made above and in the discussion below to propane systems, similar problems occur in other gas delivery systems such as natural gas systems and as discussed hereinafter, the invention is not limited to propane systems.

SUMMARY OF THE INVENTION

According to one embodiment of the present invention, an assembly kit and method are provided which permit service or repair personnel to check a propane system for leaks at the time of introduction of propane into the system and which eliminates the need for the purging described above after the test. The service person is also assisted in ascertaining whether the system is actually out of gas, requiring interruption of service, in spite of the reading(s) provided by the tank gauge(s) since such gauges may be inoperative or may be giving false readings.

In accordance with a first aspect of the invention, a method is provided for use by propane tank service personnel in detecting escaping gas in propane tank systems including a regulator and a tank service valve connected together by a standard connector, the method comprising the steps of: replacing the standard connector with a permanent valve and connector assembly including first and second end connections and a branch connection portion, a valve unit disposed in said branch connection portion and including a valve stem actuable to open said valve unit, the replacing step including connecting said first and second end connections to the tank service valve and the regulator, respectively; and using a separate pressure gauge assembly individually assigned to tank service personnel and adapted to be carried by said personnel for testing the pressure in the propane tank, said pressure gauge assembly including a pressure gauge; a valve assembly connector including means for actuating the valve unit when the valve assembly connector is connected to the valve assembly, said testing of pressure comprising connecting the valve assembly connector of the pressure gauge assembly to the branch connection portion of the valve assembly to actuate the valve unit and thus provide an immediate reading of the tank pressure by said gauge, using the reading of tank pressure in determining whether the tank is out of propane gas, and thereafter taking one or the other of the following two steps depending on the determining step: if the tank is determined to not be out of propane gas, introducing gas into the tank as needed; and if the tank is determined to be out of propane gas, turning the tank service valve off, pressurizing the tank, turning the service valve on, introducing gas into the system to pressurize the system, thereafter turning the tank service valve back off again so as to isolate the gas introduced into the tank, and reading the gauge pressure to determine whether gas is escaping from the propane tank system. It will be appreciated that because each tank service person carries his or her own gauge assembly, a separate gauge is not necessary for each propane tank system and one gauge assembly only is needed by each service person.

In a preferred, advantageous embodiment, the gauge includes an indicating needle and further comprises a pressure scale and an ambient temperature scale calibrated relative to said pressure scale so that the position of the needle that provides a reading of gauge pressure on the pressure scale also provides a reading of the corresponding minimum ambient temperature on the ambient temperature scale, and the determining step for determining whether the tank is out of propane gas includes determining the actual ambient temperature and comparing the actual ambient temperature with the reading of said corresponding minimum ambient temperature.

According to a second aspect of the invention, a kit is provided for use in a propane tank system for enabling detection of escaping gas by tank repair personnel, the tank system including a standard connector connecting a regulator to a tank service valve, and the kit comprising: a valve and connector assembly for connection between the regulator and the service valve in place of the standard connector, the valve and connector assembly comprising a connector including end connections for connection to the regulator and the service valve, respectively, a main connector portion between the said end connectors, and a branch connector portion connected at one end thereof to the main connection portion, a valve unit disposed in the branch connector portion and including a valve stem actuable to open a connection to the main connector portion; and a separate pressure gauge assembly adapted to be carried by tank repair personnel and including a pressure gauge, and a mounting means, connected to the pressure gauge, for providing connection of the pressure gauge to the branch connector portion of the valve assembly, and for, when connected to said branch connector portion, providing actuation of the valve stem so that, in use with the tank service valve open, the pressure gauge provides a reading of the tank pressure and, in use with the system pressurized and the tank service valve closed, the gauge provides an indication of the presence of a leak or open line in the propane tank system.

The gauge preferably includes an indicating needle and further comprises includes a pressure scale and an ambient temperature scale calibrated relative to said pressure scale so that the position of the needle that provides a reading of gauge pressure on the pressure scale also provides a reading of the corresponding minimum ambient temperature on the ambient temperature scale.

The valve unit advantageously comprises a Schrader valve (also referred to as a Schrader-Bridgeport valve). Further, the means disposed at the other end of the hose of the gauge assembly preferably includes a finger pressure operated screw-on connector. The latter feature enables the gauge assembly to be connected to the system without the use of wrenches or the like.

Preferably, the main connector portion includes at least one flexible portion. Advantageously, the at least one flexible portion comprises a pigtail section.

In one preferred embodiment, the branch connector portion is welded to the main portion. Advantageously, the main connector portion includes a pigtail section and the branch connector portion is welded to the pigtail section.

In another preferred embodiment, the connector includes a straight pipe connector and one of the end connectors comprises left-hand threading on the straight pipe connector for connection to the service valve.

In yet a further embodiment, the branch connector portion includes a quick coupling valve unit and the mounting means of said pressure gauge assembly includes a cooperating quick coupling connector.

In accordance with yet another aspect of the invention, a kit is provided for use in a propane tank system for enabling detection of escaping gas by tank repair personnel, the tank system including a standard connector connecting a regulator to a tank service valve, and the kit comprising: a valve and connector assembly for connection between the regulator and the service valve in place of the standard connector, the valve and connector assembly comprising a connector including end connections for connection to the regulator and the service valve, respectively, a main connector portion between the end connectors and including an outlet hole therein along its length, and a branch connector portion connected at one end thereof to the main connector portion and terminating in a free end, the branch connector portion comprising a saddle valve unit directly connected to the main connector portion over the outlet hole and including a valve stem actuable to open a connection from the connector to the free end of the branch connector portion, and a separate pressure gauge assembly adapted to be carried by tank repair personnel and including a pressure gauge, and mounting means, affixed to the pressure gauge, for providing connection of the pressure gauge to said free end of the branch connector portion of the valve assembly, and for, when connected to said free end of the branch connector portion, providing actuation of the valve stem so that, in use with the tank service valve open, the gauge provides a reading of the tank pressure and, in use with the system pressurized and the tank service valve closed, the gauge provides an indication of the presence of a leak or open line in the propane tank system.

Preferably, the saddle valve unit includes outwardly extending spaced legs which fit around the main connector portion and are welded or soldered to the main connector portion.

According to a still further aspect of the invention, a method is provided for use by propane tank service personnel in detecting escaping gas in a propane tank system including a regulator and a tank service valve connected together by a valve and connector assembly including first and second end connections connected to the tank service valve and the regulator, respectively, a branch connection portion, and a valve unit disposed in the branch connection portion and including a valve stem actuable to open the valve unit, the method comprising using a separate pressure gauge assembly individually assigned to tank service personnel and adapted to be carried by said personnel for testing the pressure in the propane tank, the pressure gauge assembly including a pressure gauge; a valve assembly connector including means for actuating the valve unit when the valve assembly connector is connected to the valve assembly, and the testing of pressure comprising connecting the valve assembly connector of the pressure gauge assembly to the branch connection portion of the valve and connector assembly to actuate the valve unit and thus provide an immediate reading of the tank pressure by said gauge, using the reading of tank pressure in determining whether the tank is out of propane gas, and thereafter taking one or the other of the following two steps depending on the determining step: if the tank is determined to not be out of propane gas, introducing gas into the tank as needed; and if the tank is determined to be out of propane gas, turning the tank service valve off, pressurizing the tank, turning the service valve on, introducing gas into the system to pressurize the system, thereafter turning the tank service valve back off again so as to isolate the gas introduced into the tank, and reading the gauge pressure to determine whether gas is escaping from the propane tank system.

Preferably, the valve and connector assembly includes a main connection portion between the first and second end connections, an outlet hole is drilled into the main connector portion at an intermediate location therealong, and the valve unit comprises a saddle valve affixed to the main connector portion over the outlet hole.

In accordance with yet another important aspect of the invention, a kit is provided for use in a propane tank system for enabling detection of escaping gas by tank repair personnel, the tank system including a standard connector connecting a regulator to a tank service valve, and the kit comprising: a valve and connector assembly for connection between the regulator and the service valve in place of the standard connector, said valve and connector assembly comprising a connector including end connections for connection to the regulator and the service valve, respectively, a main connector portion between said end connectors, a branch connector portion connected at one end thereof to said main connector portion and terminating in a free end, and a monolithic manifold block, connected in said main connector portion between two sections thereof, for connecting said main connector portion to said branch connector portion, the manifold block including a through bore in which is received facing end portions of the two sections of the main connector portion and a further bore extending orthogonally to, and connected to, the through bore, the further bore including a drilled hole portion of smaller diameter than the remainder of the further bore located adjacent to, and in communication with, the through bore, the further bore receiving therein, and being connected to, a valve unit including a valve stem actuable to open a connection from the connector to the free end of the branch connector portion, and a separate pressure gauge assembly adapted to be carried by tank repair personnel and including a pressure gauge, and mounting means, affixed to said pressure gauge, for providing connection of said pressure gauge to the free end of the branch connector portion of the valve and connector assembly, and for, when connected to said free end of said branch connector portion, providing actuation of said valve stem so that, in use with the tank service valve open, the gauge provides a reading of the tank pressure and, in use with the system pressurized and the tank service valve closed, the gauge provides an indication of the presence of a leak or open line in the propane tank system.

According to yet another aspect of the invention, a kit is provided for use in a propane tank system for enabling detection of escaping gas by tank repair personnel, the tank system including a standard connector connecting a regulator to a tank service valve, and the kit comprising: a valve and connector assembly for connection between the regulator and the tank service valve, said valve and connector assembly comprising first and second end connectors for providing communication with the regulator and the service valve, respectively, and a monolithic manifold block, said manifold block including a through bore and at least one further bore extending orthogonally to, and connected to, said through bore, one of said bores including a drilled hole portion of smaller diameter than the remainder of said one bore located adjacent to, and in communication with, the other bores, said one bore receiving therein, and being connected to, a valve unit including a valve stem actuable to open a connection to the bores of the manifold block, these other bores including a threaded end portion and the end connectors including threaded end portions adapted to be received in the threaded end portions of the other bores, the kit further comprising a separate pressure gauge assembly adapted to be carried by tank repair personnel and including a pressure gauge, and mounting means, affixed to said pressure gauge, for providing connection of the pressure gauge to the valve unit such that, when the gauge is connected to said valve unit, the valve stem is actuated so that, in use with the tank service valve open, the pressure gauge provides a reading of the tank pressure and, in use with system pressurized and the tank service valve closed, the gauge provides an indication of the presence of a leak or open line in the propane tank system.

Preferably, the assembly further comprises a flow control valve unit, adapted to be connected, in use of the kit, between the tank service valve and the manifold block, for, when actuated, isolating the tank service valve.

In accordance with a further aspect of the invention, a connector assembly is provided for direct or indirect connection to the tank service valve of a propane tank system, the connector unit comprising a unitary monolithic manifold connector block including a through bore having opposite threaded ends and at least one further bore, extending orthogonally to, and connected to, the through bore, the at least one further bore having a threaded end, and one of said bores including a drilled hole portion of smaller diameter than the remainder of the associated bore, the assembly further comprising a valve unit including a threaded end received in said one bore, and a first and second threaded connectors adapted to be received in two of said threaded ends.

In an advantageous embodiment, a flow control valve having a threaded end is connected to one of said threaded ends between said manifold block and an associated one of said connectors, the associated connector being adapted to be connected to the tank service valve and the flow control valve, when closed, shutting off the connection between the tank service valve and the manifold block.

The at least one further bore preferably comprises a further through bore extending orthogonally to the first mentioned through bore and having threaded opposite ends. Advantageously, a pressure bleed valve is connected to one of the threaded ends.

According to a further aspect of the invention, a pressure gauge test device is provided for testing mobile pressure gauges used by driver and service personnel for propane tank systems, the device comprising: a unitary monolithic connector block including first and second orthogonal through bores therein providing four connection ports, a male connector connected to one of said ports, a female connector connected to a separate one of said ports, a pressure gauge permanently connected to a further one of said ports, and a valve unit connected to another one of said ports and including a valve stem, actuated responsive to connection to the valve unit of a pressure gauge to be tested, for, when actuated, opening a connection to the bores in the manifold block.

In accordance with a further embodiment of the invention, a liquid propane system is provided including a propane tank, a tank service valve connected to the tank, a pressure regulator connected to the tank service valve, and a flow control valve device connected between the tank service valve and the pressure regulator, the flow control valve device including pressure tap means for enabling gauge measurement of tank pressure and including a flow restrictive orifice having a diameter of no greater than 0.054 inches.

In one implementation, the valve device includes shut-off valve unit and said pressure tap means comprising a pressure tap unit separate from said valve unit and connected thereto.

In an alternative implementation, the valve device comprises a shut-off valve unit including valve body and said pressure tap means comprises pressure tap port formed integrally with said valve body. Advantageously, the shut-off valve unit includes a valve operator having a open and closed positions and a locking element for selectively locking said valve operator in either of said positions. Preferably, the valve operator comprises a valve handle, the valve unit further includes a valve stem and the locking element comprises a locking screw connecting said valve handle to said valve stem, said locking screw including a locking recess of a non-standard shape adapted to engage a locking tool including a screwdriver portion of a shape matching that of said locking recess. In one embodiment, the flow restrictive orifice is formed in said pressure tap port. In another embodiment, the flow restrictive orifice is formed in a separate component connected to said pressure tap port.

In accordance with yet another embodiment, a liquid propane system including a propane tank, a tank service valve connected to the tank, a pressure regulator connected to the tank service valve and comprising a first regulator stage, a second regulator stage, and a connection between said first and second stages, and a flow control valve device connected in the connection between said first regulator stage and said second regulator stage, said flow control valve device including pressure tap means for enabling gauge measurement of pressure in the connection between said first and second regular stages and including a flow restrictive orifice having a diameter of no greater than 0.054 inches.

In one implementation, the valve device includes shut-off valve unit and said pressure tap means comprising a pressure tap unit separate from and connected to said valve unit.

In an alternative implementation, the valve device comprises a shut-off valve unit including valve body and the pressure tap means comprises pressure tap port formed integrally with said valve body. Preferably, the shut-off valve unit includes a valve operator having a open and closed positions and a locking element for selectively locking said valve operator in either of said positions. Advantageously, the valve operator comprises a valve handle, the valve unit further includes a valve stem and said locking element comprises a locking screw connecting said valve handle to said valve stem, said locking screw including a locking recess of a non-standard shape adapted to engage a locking tool including a screwdriver portion of a shape matching that of said locking recess. In one embodiment, the flow restrictive orifice is formed in said pressure tap port. In another embodiment, the flow restrictive orifice is formed in a separate component connected to said pressure tap port.

According to a further aspect of the invention, a gas delivery system is provided including a gas service line, a pressure regulator connected in the gas service line, and a flow control valve device permanently installed at a predetermined location in said gas service line, said flow control valve device comprising a valve body including an integral pressure tap for enabling a measurement of gas pressure at said predetermined location; a valve operator having an open position in which flow takes place through the valve device and a closed position in which flow through the valve device is blocked and locking means for selectively locking said valve operator in said open position and in said closed position.

Advantageously, the valve operator comprises a valve handle, said valve unit further includes a valve stem and said locking element comprises a locking screw connecting said valve handle to said valve stem, said locking screw including a locking recess of a non-standard shape adapted to engage a locking tool including a screwdriver portion of a shape matching that of said locking recess. In an important implementation, the pressure tap includes a flow restrictive orifice formed therein.

In one embodiment of this aspect of the invention, the system comprises a propane delivery system including a propane tank and a tank service valve, and said flow control valve device is connected between said tank service valve and said regulator. In a further embodiment, the system comprises a propane gas delivery system including a propane tank and a tank service valve, the regulator includes first and second regulator stages, and the flow control valve is connected between said first and second regulator stages.

In another embodiment the system comprises a natural gas delivery system and said valve is installed in said service line upstream of said regulator. Alternatively, or in addition, a valve is installed in said service line downstream of said regulator. In a further embodiment wherein said system comprises a natural gas delivery system including a gas meter, the valve is installed in said service line downstream of said meter.

According to a further aspect of the invention, a natural gas delivery system is provided including a gas service line, a pressure regulator connected in the gas service line, a gas meter connected in said gas service line, and a flow control valve device permanently installed in the gas service line downstream of said meter, said flow control valve device comprising a valve body including an integral pressure tap for enabling measurement of gas pressure at said meter, a valve operator having an open position in which natural gas flows through the valve device and a closed position wherein natural gas is blocked from flow through the valve device and locking means for selectively locking said valve operator in said open and closed positions.

Advantageously, the valve operator comprises a valve handle, the valve unit further includes a valve stem and the locking element comprises a locking screw connecting said valve handle to said valve stem, said locking screw including a locking recess of a non-standard shape adapted to engage a locking tool including a screwdriver portion of a shape matching that of said locking recess.

Other features and advantages of the invention will be set forth in, or apparent from, the following detailed description of the preferred embodiment of the invention.

BRIEF DESCRIPTION OF THE DRAWINGS

FIG. 16 is an exploded side elevational view of an embodiment similar to that of FIG. 15, as adapted to be connected to a tank service valve and including an optional flow control valve;

FIG. 16(a) is a perspective view of the flow control valve of FIG. 16;

DESCRIPTION OF THE PREFERRED EMBODIMENTS

Figure 1:
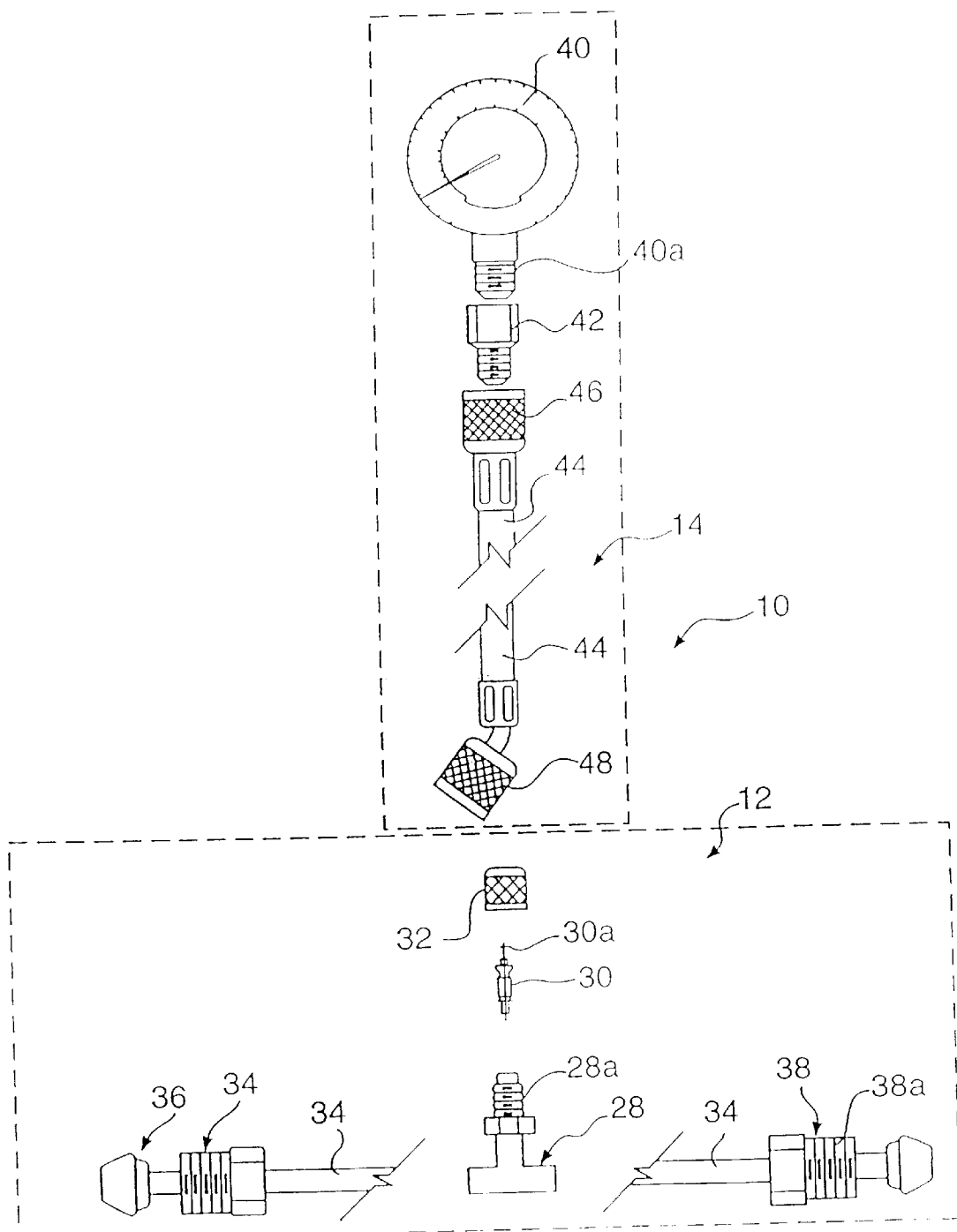
FIG. 1 is an exploded front elevational view of a pressure testing kit or assembly constructed in accordance with a preferred embodiment of the invention.

Referring to FIG. 1, there is shown an exploded front elevational view of the propane tank leakage detection kit or assembly of the invention. The overall assembly, which is generally denoted 10, basically comprises a valve assembly 12 which is adapted to be installed on the tank and a pressure gauge assembly 14 which is carried by repair or service personnel and, as explained in more detail below, is adapted to be connected in line in the tank system and used in cooperation with valve assembly 12 to provide an indication or measurement of the gas pressure within the tank.

Figure 3:
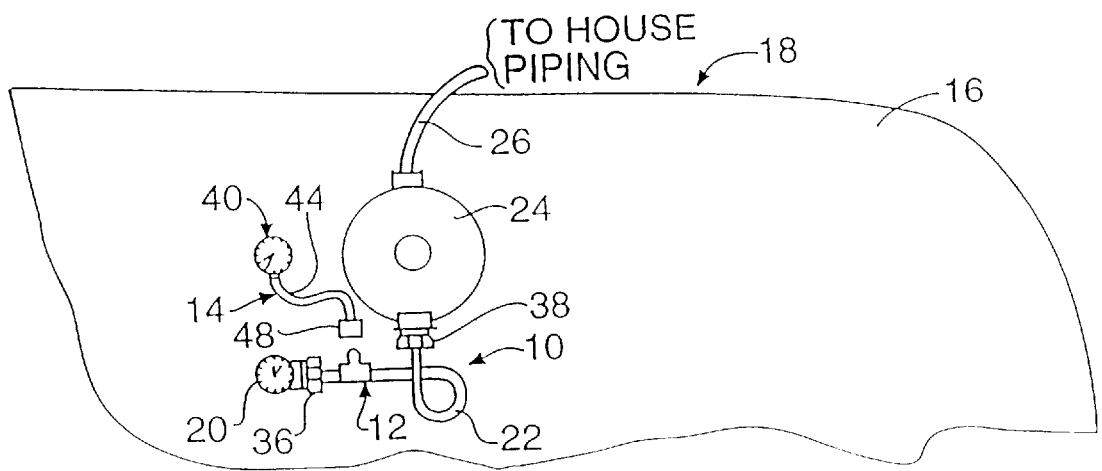
FIG. 3 is a front elevational view of the gauge of FIG. 1.

Before considering the two assemblies 12 and 14 in more detail, reference is made to FIG. 3 which shows the assembly 10 about to be used to measure the pressure with a propane tank 16 of a propane tank system generally denoted 18. The propane tank system 18 includes a tank valve 20 located at the top of tank 16 generally centrally thereof, a flexible "pigtail" connector 22 which connects tank valve 20 to a regulator 24 and an outlet connector 26 which connects regulator 24 to the house piping, i.e., the piping into the house at which the tank system 18 is used.

It will be understood that tank valve 20, regulator 24 and connector 26 are conventional, and that a conventional system would include a connection, typically in the form of a pigtail connector, between the tank valve and regulator. However, in accordance with a preferred embodiment of the present invention, the conventional connection between valve 20 and regulator 22 is replaced by a connector 22 which is constituted by or incorporates a valve assembly 12 corresponding to that shown in FIG. 1 and which cooperates with a pressure gauge assembly 14 which is shown in FIG. 3 and which also corresponds to that shown in FIG. 1.

Referring again to FIG. 1, valve assembly 12 includes a tee connector 28 which includes a central branch forming a male flare connection 28a adapted to receive therein a valve unit or valve 30. Valve 30 is preferably a conventional Schrader valve such as the valves which are conventionally used in refrigeration systems. Such a valve is described in, for example, in U.S. Pat. No. 4,338,793 to O'Hern, Jr. referred to above. The valve 30 includes a valve stem or operator 30a which controls opening and closing of the valve 30 in a conventional manner. A knurled valve cap 32 fits over the male connection 28a when the valve is not connected to gauge assembly 14. The base of tee connector 28 is fitted in line into a flexible connector 34 so that, with valve 30 closed, a direct or through connection is provided thereby between tank valve 20 and regulator 24. At opposite ends of flexible connector 34 are conventional end connections 36 and 38 including male unions 36a and 38a. It is to be understood that apart form connection therein of a valve unit therein the flexible connection 34 and end connections 36 and 38 are entirely conventional and themselves form no part of the invention. The elements are considered to be part of valve assembly 12 because, in accordance with a preferred embodiment of the invention, the entire existing standard or conventional connection between tank valve 20 and regulator 24 is replaced by valve assembly 22 rather than inserting a valve unit in the existing connection. Further, the end connections 36 and 38 (and particularly the latter) can take different forms depending on the nature of the existing connection in the propane system.

Turning now to the gauge assembly 14 (FIG. 3), this assembly includes a gauge 40 with a main connector 40a, an intermediate connector element 42, and a hose 44 with a first female flare union 46 at the end thereof proximate to gauge 40 and a second female flare union 48 at the opposite end thereof. Union 48 includes an actuator pin or member (not specifically shown) which provides actuation of valve stem 30a and thus opening of valve unit 30 when union 48 is screwed on the male flare connection 28a of tee connector 28.

Figure 2:
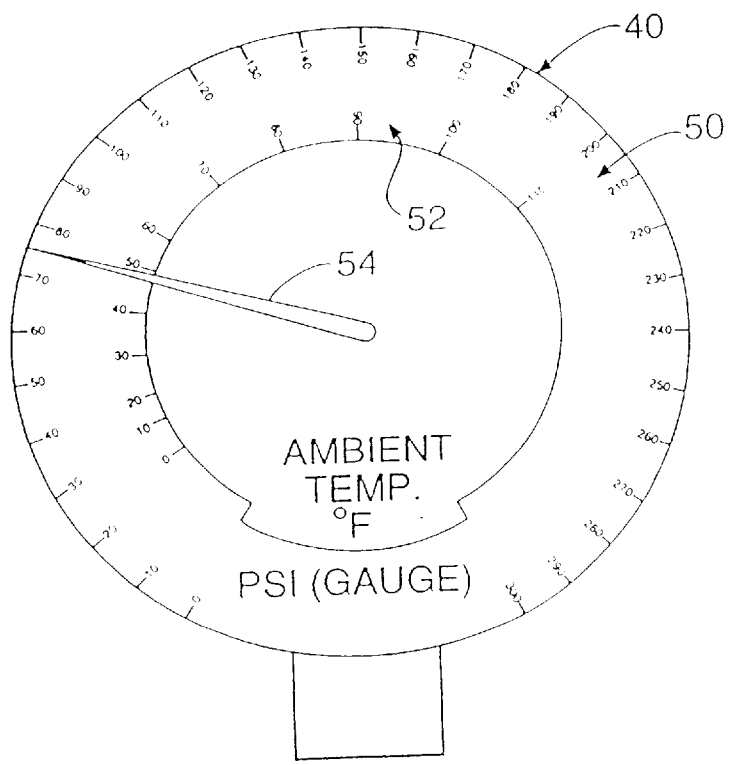
FIG. 2 is a top plan view of a propane tank incorporating the testing assembly of FIG. 1.

The face of gauge 40 is shown in more detail in FIG. 2. Gauge 40 is a pressure gauge and in the illustrated embodiment, a measurement band or scale 50 provided around the outer periphery of the gauge indicates the measured gauge pressure in pounds per square inch, while an inner, concentric, part-circular measurement band or scale 52 provides an indication of the corresponding ambient temperature in degrees F. In the latter regard, the temperature scale 52 is calibrated to provide an indication of the minimum ambient temperature for the corresponding pressure reading so that, as shown, for a measurement of 40 psi gauge the ambient (or outside surrounding) temperature should be no higher than about 20° F. while for measurement of 50 psi gauge the ambient temperature should not be higher than roughly about 52° F. These pressure-temperature relationships have been previously determined for propane tanks and by incorporating the relationships into gauge 40, a repairman, knowing the ambient temperature, is provided with a direct indication as to whether the tank 16 may be out of fluid. Thus, considering the position of the needle 54 of gauge 40 shown in FIG. 2, the ambient temperature corresponding to the pressure reading (of about 75 psi) is about 48° F. so that the actual ambient temperature is higher, the tank 18 is possibly out of liquid.

It is to be understood that the indication provided by gauge 40 essentially concerns the rate of vaporization of the liquid so that when the ambient temperature reading corresponding to the gauge pressure is lower than the actual ambient temperature, an indication is provided that the vaporization rate in the tank 16 is insufficient. It will be appreciated that there can be more than one cause for this so that the tank may not actually be empty. For example, the situation may be one wherein the liquid in the tank is being used at a very high rate when the pressure measurement is made or one where the tank is too small and a larger tank is thus required. In any event, the pressure measurement and the corresponding calibrated value of the ambient temperature as compared with the actual temperature alert the repairman to a possible problem, including the possibility that the tank is empty.

Considering the overall operation of the assembly 10 of FIGS. 1 to 3, to install the valve assembly 12, the repairman simply replaces the existing, typically flexible connection between tank valve 20 and regulator 24 with valve assembly 12. With the valve assembly in place, to make a pressure measurement, cap 32 is removed from tee section 28 and the end connector or hose 44 is screwed onto tee section 28 so as to actuate valve 30 and open a path to gauge 40. A reading is then taken to determine whether the tank is out of liquid. As discussed above, even if a pressure reading is obtained, the repairman will be alerted to the possibility that the tank is out of liquid if the corresponding calibrated ambient temperature reading on scale 52 is less than the actual ambient temperature. Assuming that some filling of the tank 16 is required, the tank is pressurized and the tank valve 20 is closed. At this point, gauge 40 is checked again to determine whether there is a leak. If gauge 40 provides a steady reading, there is no leak downstream thereof. On the other hand, if there is a significant fall in pressure and, in particular a fall in pressure within the limits of sections 54 and 58 of the NFPA Pamphlet referred to above, it can be safely assumed that there is a leak in the system or an open appliance valve. The gas supply valve should then be left off, the customer notified and repairs made, as required.

Although the use of the gauge shown in FIG. 1 is generally preferred because of the ease of reading thereof, such a gauge may not be necessary in locations such as the sub-tropics where the temperature remains substantially constant during the work day and thus a conventional pressure gauge would be suitable. Further, although this would be more cumbersome, a chart or table showing vapor pressure of propane, such as that set forth below, can be used in combination with a conventional pressure gauge to relate temperature and pressure.

TABLE 1

| VAPOR PRESSURES OF PROPANE | | | |
|---|---|---|---|
| 130° F. | 257 psig | 20° F. | 40 psig |
| 120° F. | 225 psig | 10° F. | 31 psig |
| 110° F. | 197 psig | 0° F. | 23 psig |
| 100° F. | 172 psig | −5° F. | 20 psig |
| 90° F. | 149 psig | −10° F. | 16 psig |
| 80° F. | 128 psig | −15° F. | 13 psig |
| 70° F. | 109 psig | −20° F. | 10 psig |
| 65° F. | 100 psig | −25° F. | 8 psig |
| 60° F. | 92 psig | −30° F. | 5 psig |
| 50° F. | 77 psig | −35° F. | 3 psig |
| 40° F. | 63 psig | −40° F. | 1 psig |
| 30° F. | 51 psig | −44° F. | 0 psig |

Figure 4:
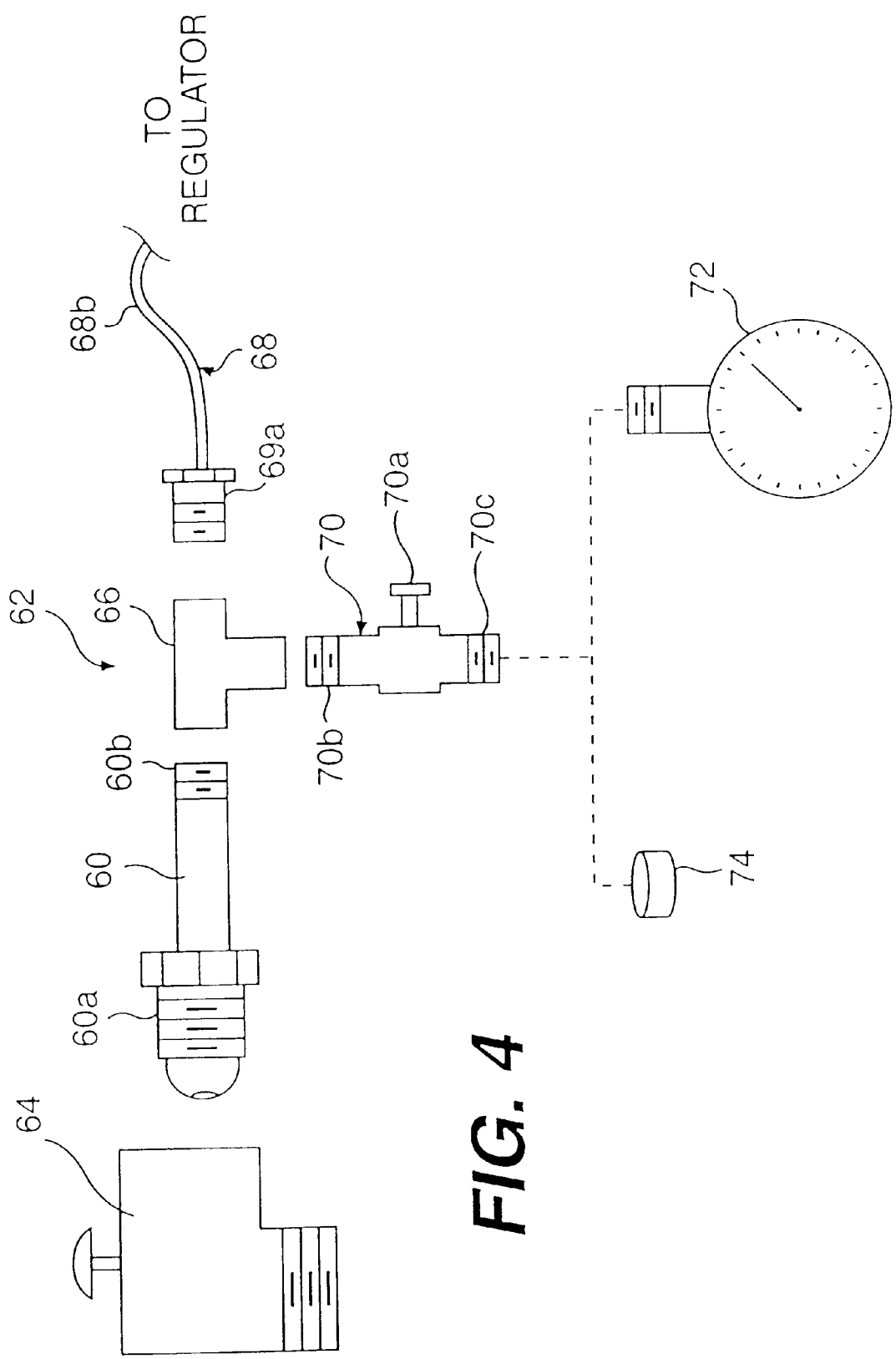
FIG. 4 is an exploded front elevational view of another embodiment of the kit of FIG. 1.

Referring to FIG. 4, a first alternative embodiment of the invention is shown. In this embodiment, a straight pipe brass connector 60 is used to connect the overall valve and connector assembly 62 to the a conventional tank valve, indicated at 64. Connector 60 includes conventional left-hand threading 60a for making this connection. The threading 60b at the other end of connector 60 is used to make a connection with the main body of a one piece female tee connector 66.

The other end of the main body of tee connector 66 is adapted to be connected to the threaded end 68a of a pigtail connector 68 which includes a pigtail portion 68a and which connects to the regulator (not shown in FIG. 4).

In this embodiment, a needle valve unit 70, including a valve control member 70a and male threads 70b and 70c at opposite ends thereof, is connected to the branch connector portion of tee connector 66. The valve control member 70 controls opening and closing of the associated valve of valve unit 70, i.e., this is not effected automatically as in the previous embodiment.

A pressure gauge 72 is screwed onto valve unit 70 when a pressure measurement is to be made whereas a cap 74 can be screwed onto valve unit 70 at other times. As set forth above, pressure gauge 72 can be a pressure gauge such as that shown in FIG. 3 or can be a conventional (e.g., 300 psig) pressure gauge for use with a chart or table which corresponds to Table 1 above relating temperature and vapor pressure and which would be adapted to be carried by the service personnel.

Figure 5:
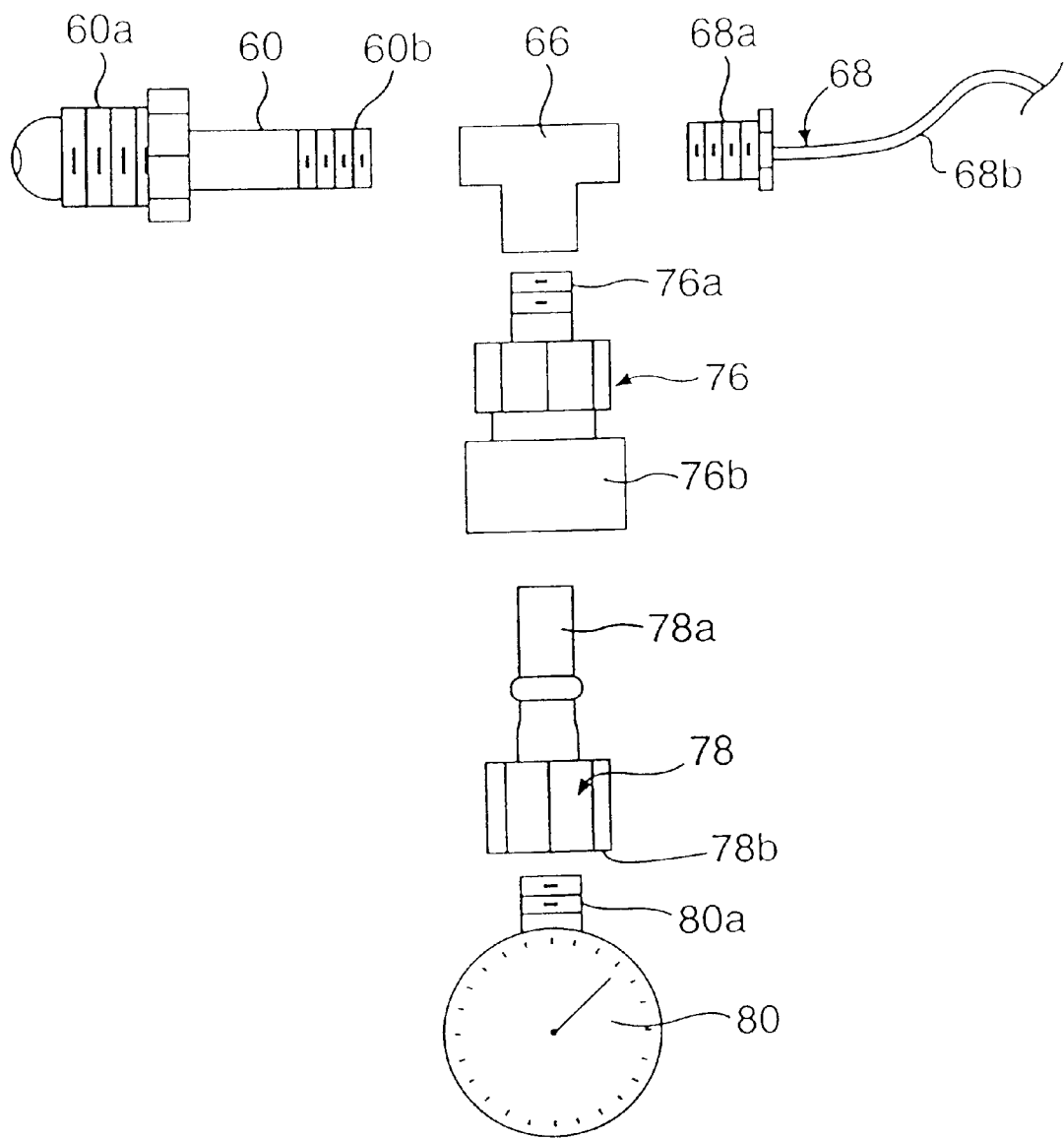
FIG. 5 is an exploded front elevational view of yet another embodiment of the kit of FIG. 1.

Referring to FIG. 5, a further embodiment of the invention is shown. This embodiment uses a number of components in common with the embodiment of FIG. 4 and these components, viz., the straight pipe connector 60, the tee connector 66 and the pigtail connector 68, have been given the same reference numerals. This embodiment differs from that of FIG. 4 in that the tee section also includes a female, liquid petroleum approved, quick coupling valve unit 76 which is adapted to be screwed by means of threading 76a onto the branch connection portion of tee connector 66. Valve unit 76 is essentially conventional and includes an associated valve (not shown in FIG. 5) which is actuated when a male connector element 78a of a conventional male quick coupling unit 78 is inserted into the female receptacle 76a of coupling unit 76. Screw threadings 78b enable male unit 78 to be connected to complementary threadings 80a of a pressure gauge 80 which, again, can be the gauge of FIG. 3 or a more conventional gauge. Thus, a gauge reading can be provided by coupling male unit 78 with the associated gauge 80 screwed thereon, to the female valve unit 76 in the general manner of the embodiment of FIG. 1.

Figure 6:
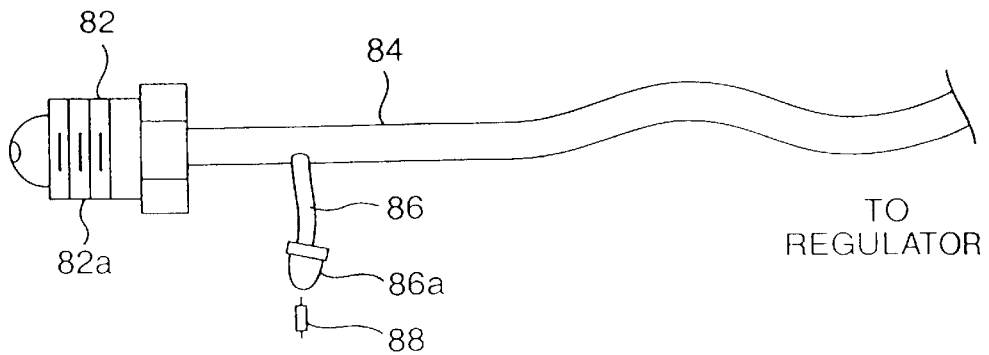
FIG. 6 is an exploded front elevational view of a further embodiment of the kit of FIG. 1.
Figure 6:
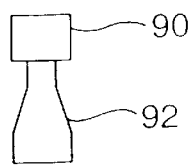
Figure 6:
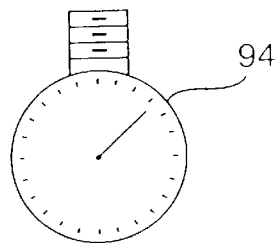

Turning to FIG. 6, yet another embodiment of the invention is shown. In this embodiment, the connector portion of the valve and connector assembly comprises connector element 82, which is similar to the connector element of the straight pipe connectors 60 of FIGS. 4 and 5 and which includes corresponding threading 82a for connection to the tank valve (not shown in FIG. 6), and a pigtail connector 84, which is connected at its free end to the regulator (not shown). Further, instead of providing a separate tee connector as such, a tee or branch connection is provided by welding a Schrader valve unit 86 to the pigtail connector section 84. The core of the Schrader valve of unit 86 is indicated at 88 and valve unit 88 includes a conventional free end connector 88a adapted to be received in a swivel nut 90 with a depressing stem (not shown) for actuating the Schrader valve. A flange adapter 92, affixed to swivel nut 90, enables connection to a gauge 94 which, again, can be either of the two basic types discussed above.

Figure 7:
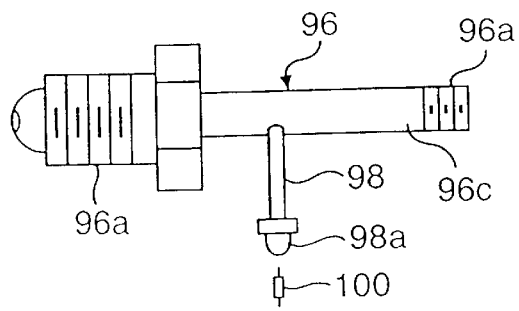
FIG. 7 is an exploded front elevational view of still another embodiment of the kit of FIG. 1.
Figure 7:
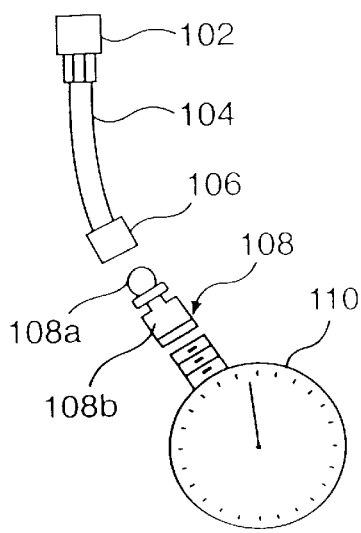

Referring to FIG. 7, still another embodiment of the invention is shown. This embodiment differs from those discussed above in that a direct hookup or connection to the regulator is provided and is particularly useful with systems employing liquid petroleum cylinders or bottles. A brass straight pipe connector 96 with conventional left-handed threading 96a for connection to the tank valve (not shown in FIG. 7) also includes suitable threading 96b at the other end of the straight pipe section 96c of connector 96 for providing the direct connection to the cylinder regulator (not shown). Similarly to the embodiment of FIG. 6, a Schrader valve unit 98 is welded to the straight pipe section 96c and includes a valve core 100, and a swivel nut 102 for actuating the Schrader valve is also provided. A flexible hose 104 connects nut 102 to a second female swivel nut 106 which differs from swivel nut 102 in that nut 106 does not include an actuating stem. A further connector 108, including a male flare 108a and a female adapter 108b, is used to connect hose 106 to a suitable gauge 110.

Figure 8:
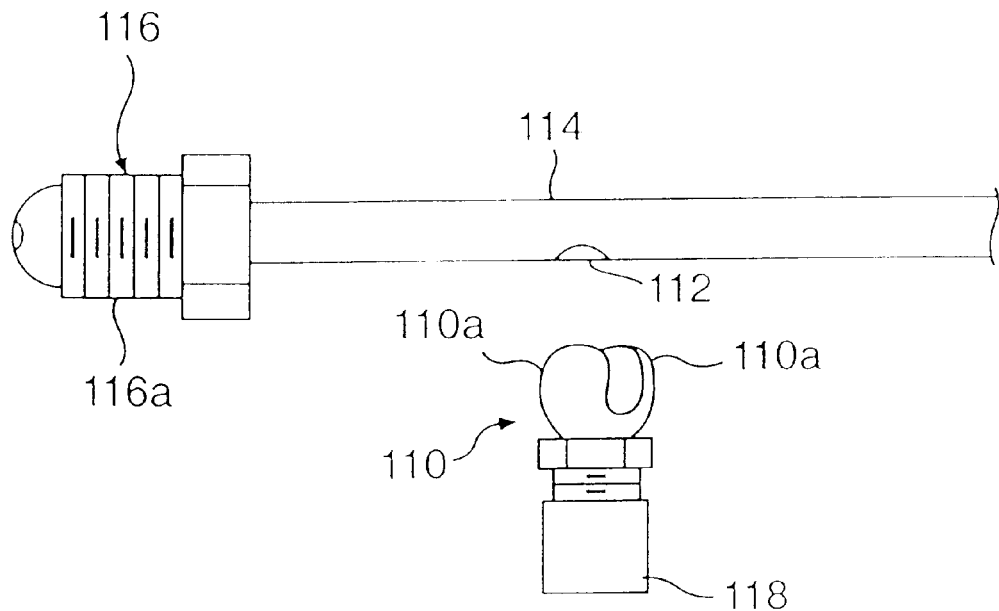
FIG. 8 is an exploded front elevational view of yet another embodiment of a part of the kit of FIG. 1.
Figure 9:
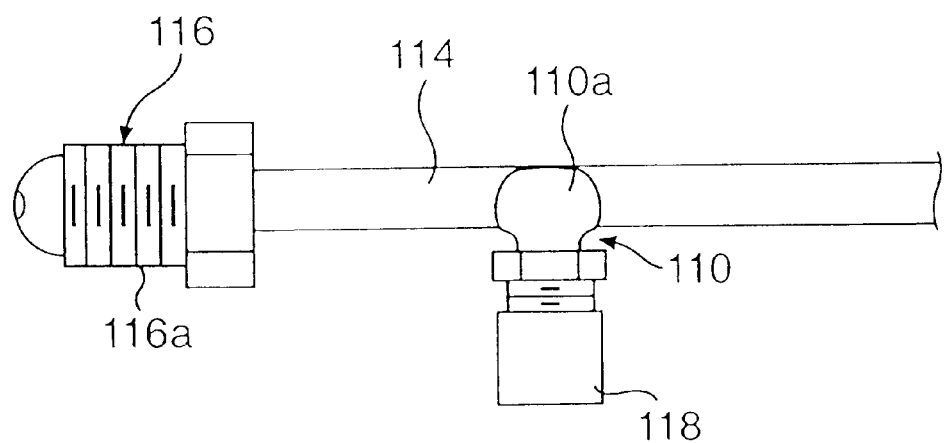
FIG. 9 is a front elevational view of the embodiment of FIG. 8, as assembled.

Referring to FIGS. 8 and 9, there is shown yet another embodiment of the invention. This embodiment is similar to that of FIGS. 6 and 7 in that a valve connection is again made directly to the pipe connection to the tank valve (rather than using a tee connector), but in this embodiment a "saddle" valve unit, indicated at 110, is used to make the direct connection. As shown in FIG. 8, a hole 112 is provided, e.g., by drilling, in a pipe connector 114. The latter may be a straight connector or a pigtail connector and includes an end connector 116 with conventional left hand threading 116a. In a specific exemplary implementation, connector 114 is either ¼" or ⅜" by 12" copper pigtail tube.

The legs 110a of saddle valve unit 110, which are skewed in FIG. 8 for purposes of illustration, fit around connector 114 and the saddle valve unit 110 is soldered or welded directly onto connector 114 over the drilled hole 112. A knurled end cap or valve cap 118, generally corresponding to end cap 32, is connected to the free end of valve unit 110.

An advantage of the embodiment of FIGS. 8 and 9 over those of FIGS. 6 and 7 is that a stronger connection is provided between the valve assembly and the connector piping. Valve unit 110 preferably incorporates a Schrader valve but can employ another type of valve as discussed above. It will be understood that a meter or gauge would also be part of the overall kit or assembly and would, in use, be connected to the valve 110 after the cap 118 was removed, as described above in connection with the other embodiments.

Figure 10:
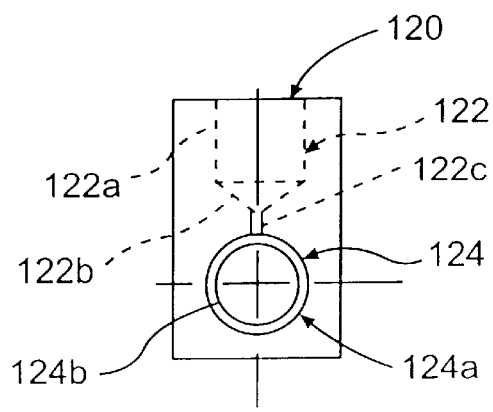
FIGS. 10, 11 and 12 are an end elevational view, a front elevational view and a top plan view, respectively, of still another embodiment of the invention.
Figure 11:
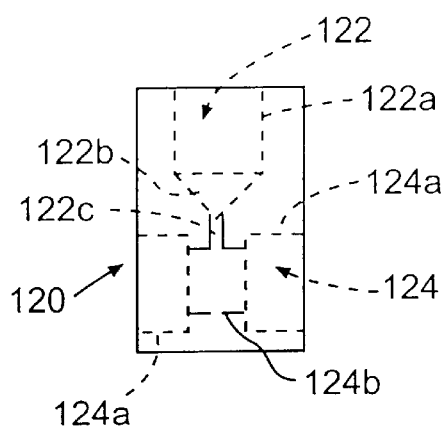
Figure 12:
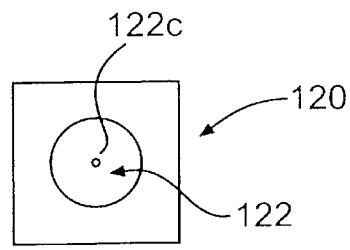

Referring to FIGS. 10 to 13, still another preferred embodiment of the invention is shown. In this embodiment, a manifold block 120, best seen in FIGS. 10 to 12, is used to make the valve connection to pipe connector to tank valve. As illustrated, block 120 includes orthogonal bores 122 and 124, with a bore 124 extending completely through the block 120 between the sides thereof. Bore 124 comprises a first diameter portion 124a adjacent each of the sides which steps down to a second, smaller diameter portion 124b between the side portions 124a. Bore 122 includes a cylindrical portion 122a, a tapered portion 122b and a small diameter portion 122c which communicates with the central portion 124b of bore 124. The small diameter portion 122c is the #54 orifice required by NFPA specifications or a smaller orifice. A #54 orifice is an orifice having a diameter of 0.054 inches.

Figure 13:
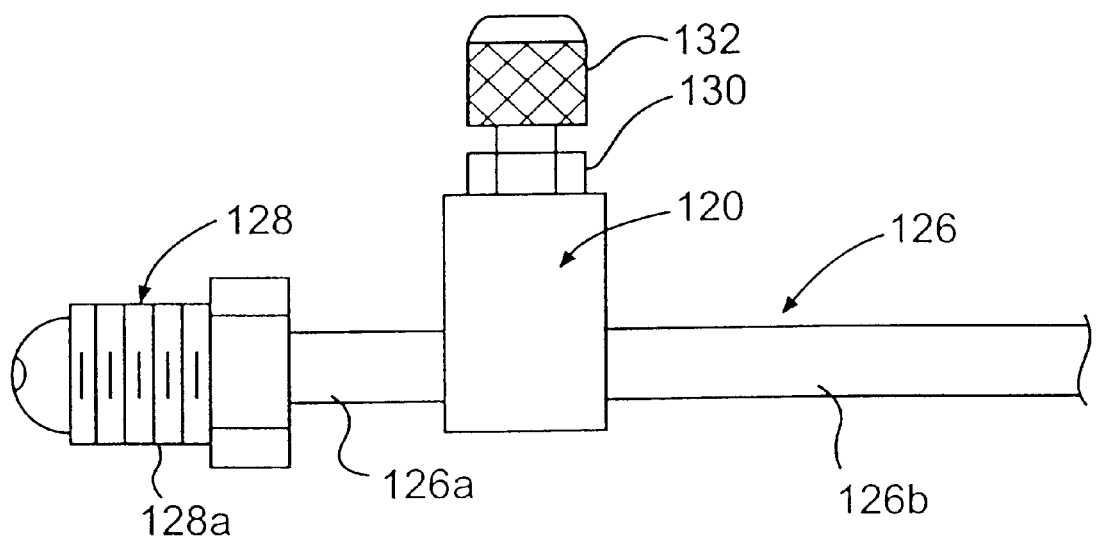
FIG. 13 is a front elevational view of the embodiment of FIG. 8, as assembled with a valve unit and installed.

Referring to FIG. 13, the manifold block 120 is shown in the fully assembled state thereof mounted between sections 126a and 126b of pigtail pipe connector 126 connected to an end connector 128 with conventional left hand threading 128a. In contrast the "saddle valve" embodiment of FIGS. 8 and 9, wherein the saddle valve unit 110 which includes the Schrader-Bridgeport housing LP valve core and end cap 118, is attached to the pigtail 114 by soldering, brazing or the like and the required small hole 112 (the #54 orifice mentioned above or a smaller orifice) is drilled into the tubing through the center of the valve housing, attachment of the manifold block 120 involves a different procedure. This procedure includes cutting the pigtail 126 (into sections 126a and 126b), deburring the cut end surfaces and the attaching the cut ends, by welding, brazing or the like, to the respective side bore portions 124a and 124b of bore 124. Further, a valve core housing 130 is then inserted into bore 122 and attached to the block 120, again by welding, brazing or the like. The very small diameter bore or hole 122c (#54 orifice or smaller) is drilled at this time. This procedure, i.e., later drilling of hole 122c ensures that the welding or brazing operation will not result in obstruction of the hole 122c. Thereafter, the valve core (not shown in FIG. 13) is inserted into housing 130 and an end cap 132 attached.

Figure 14:
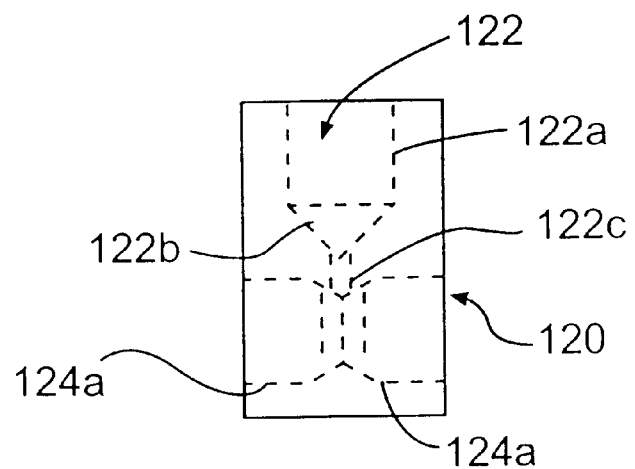
FIG. 14 is a front elevational view of an alternative implementation of the embodiment of FIGS. 10 to 12.

FIG. 14 shows an alternative, presently preferred implementation of the embodiment of FIGS. 10 to 13. In this embodiment, the countersunk cylindrical portion 124b of bore 124 is eliminated and the side portions 124a are in direct communication. The facing ends of the side portions 124a are tapered or angled (at a 59° angle in a specific, non-limiting example) as shown.

Figure 15:
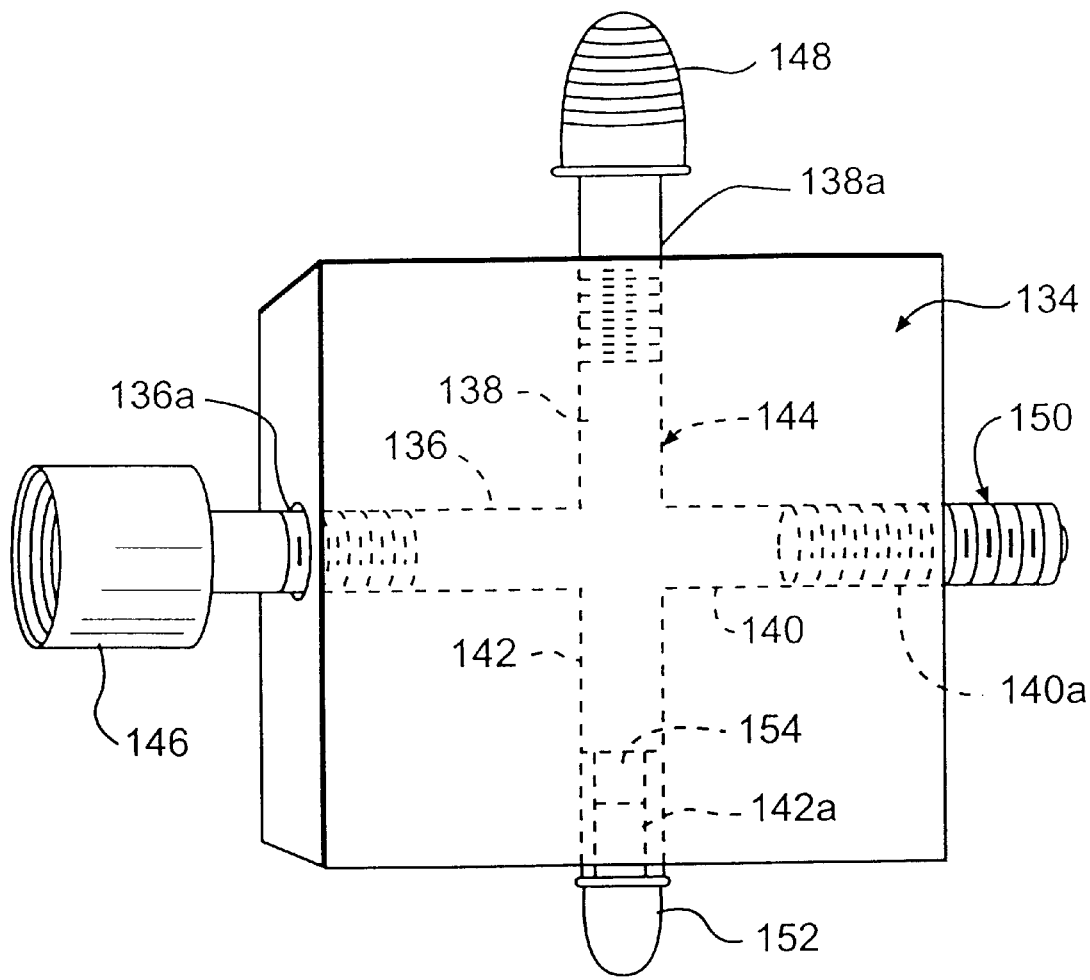
FIG. 15 is a perspective view of a further implementation of the basic embodiment shown in FIGS. 10 to 12.

Referring to FIG. 15, a further embodiment of the manifold block of the invention is shown. In contrast to specific implementation of the embodiments of FIGS. 10 to 14 that is shown in FIG. 13, i.e., wherein the block 120 includes three drilled, female connections for making a soldered connection to appropriately sized copper tubing (e.g., ¼ inch or ⅛ inch thick) with suitable connections at either end (e.g., M.POL and F.POL or M.POL and M.NPT connections) and a pressure valve housing (e.g., a Schrader-Bridgeport valve), and a drilled orifice of a suitable size (e.g., a #54 orifice or smaller) in the pressure valve connection, the manifold block 134 includes three, or four, as in the embodiment illustrated in FIG. 15, bores 136, 138, 140 and 142 with corresponding threaded (drilled and tapped) female connections 136a, 138a, 140a and 142a at the ends thereof. The bores 136, 138, 140 and 142 form a cross tee bore configuration, generally denoted 144, within block 134. A first, female connector 146 (e.g., a F.POL×M.NPT connector) is connected to bore 136 and a second, male connector 148 (e.g., a M.POL×M.NPT connector) is connected to threaded bore 138. An optional bleeder valve 150 is connected to optional threaded bore 140. A valve unit 152 (e.g., a conventional Schrader valve, i.e., a Schrader-Bridgeport valve) is connected to threaded bore 142. Bore 142 includes a reduced diameter orifice 154 which is preferably a #54 orifice or smaller. This embodiment eliminates the pigtail associated with the block 120 of FIG. 13 and enables the block 134 to be directly connected in place in the system. Otherwise, the block 134 is similar to the block of FIGS. 11 to 14, apart from the optional bleeder valve 150 and optional associated bore 140. Bleeder valve 150 is a conventional bleeder valve and performs a standard pressure bleed function.

Referring to FIG. 16, there is shown a further embodiment of the invention related to those of FIGS. 11 to 15. In FIG. 16, a conventional tank service valve 156 (corresponding, e.g., to tank valve 20 of FIG. 3) including an inlet connection 156a threadably receiving a male connector 158 (e.g., a M.POL×M.NPT connector) generally corresponding to connector 148 of FIG. 15. In an exemplary, non-limiting embodiment, connector 158 is a M.POL (CGA 510) element with a ⅞ inch hex nut and ¼ inch M.NPT.

A three-port manifold block 160 (generally corresponding to block 134 of FIG. 15, without bleeder valve bore 140) includes a first threaded port or bore 160a which either receives the threaded end 158a of connector 158 or, as illustrated receives the threaded end 162a of an optional, generally conventional flow control valve unit 162, preferably in the form of a shut-off ball valve, which is shown in more detail in FIG. 16(a). In the illustrated embodiment employing shut-off valve unit 162, flow control or shut-off valve unit 162 receives the threaded end 162a of connector 158 and is used, through the operation of control handle 162b (see FIG. 16(a)), to shut off the connection to tank service valve 156.

A valve unit 164 (e.g., a Schrader-Bridgeport valve corresponding to valve unit 152 of FIG. 15) is connected to a further bore or port 160b of block 160 which includes a #54, or smaller, orifice 160c.

A female connector 166 is screwed into a further port or bore 160a which is formed in block 160 and which is coextensive with bore 160a, i.e., is part of the same through bore.

The shut-off valve 162 can be used to isolate the tank service valve 156 so as to enable confirmation of leakage at valve 156. In addition, shut-off valve 162 can also be used to provide a means for servicing the associated tank (e.g., corresponding to tank 16 of FIG. 3) without interrupting service. Such servicing could include valve replacement, painting of the tank, tank exchange and the like. To accomplish this without interrupting service, a further LP tank (not shown), carried, e.g., on the truck of the service person, would be connected to valve unit 164 of manifold block 160 to provide LP service while, at the same time, flow control valve 162 would be closed to disconnect the M.POL connection provided by connector 158 to the tank service valve 156 and thus to the tank (not shown) being serviced. With connector 158 unscrewed from the tank service valve 156, the corresponding tank can be removed for whatever servicing, repair or replacement that is necessary. It will be understood that, normally, service must be interrupted and the regulator, pigtail, and associated parts removed, to enable such things to be done, whereas the invention eliminates the need for such service interruption and part removal.

Figure 17:
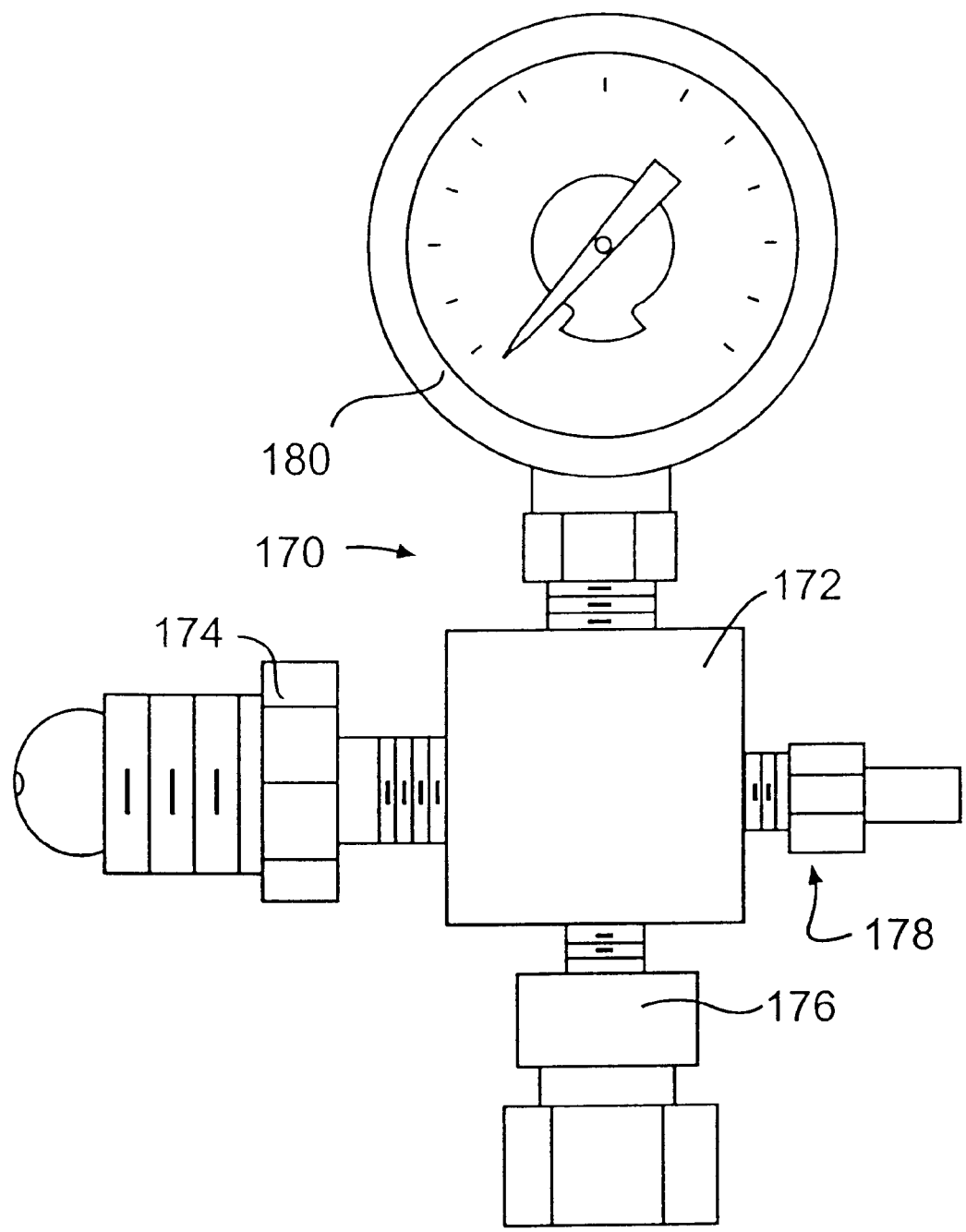
FIG. 17 is a front elevational view of a pressure gauge test device in accordance with yet another embodiment of the invention.

Referring to FIG. 17, a further embodiment of the invention is shown, The device shown in FIG. 17, which is generally denoted 170, is a gauge tester and is based on the manifold block embodiments described above. Gauge tester device 170 includes a "cross tee" manifold block 172 having four ports, as in the embodiment of FIG. 15. A male connector 174 (e.g., a M.POL×¼ inch (or larger or smaller) M.NPT or soldered like connector component) is connected to a first port, a female connector 176 (e.g., a F.POL×¼ inch (or larger or smaller) M.NPT or soldered like connector component) is connected to a second port, a pressure valve housing 178 (e.g., a Schrader-Bridgeport valve) 178 is connected to a third port and a pressure gauge 180 (e.g., a 300 psi gauge) is permanently connected (e.g., soldered) to a fourth port. The gauge tester device 170 is adapted to be used at LP dealer service centers to test the accuracy in the pressure readings provided by the mobile gauges used by driver and service personnel. Such a test pressure gauge (not shown) would be connected to valve housing 178 for testing. Although a four port device is shown which is particularly adapted for use in "in service" or "in use" applications, a three port embodiment, wherein the female port (POL) is eliminated, is preferred for "isolated" testing.

Figure 18:
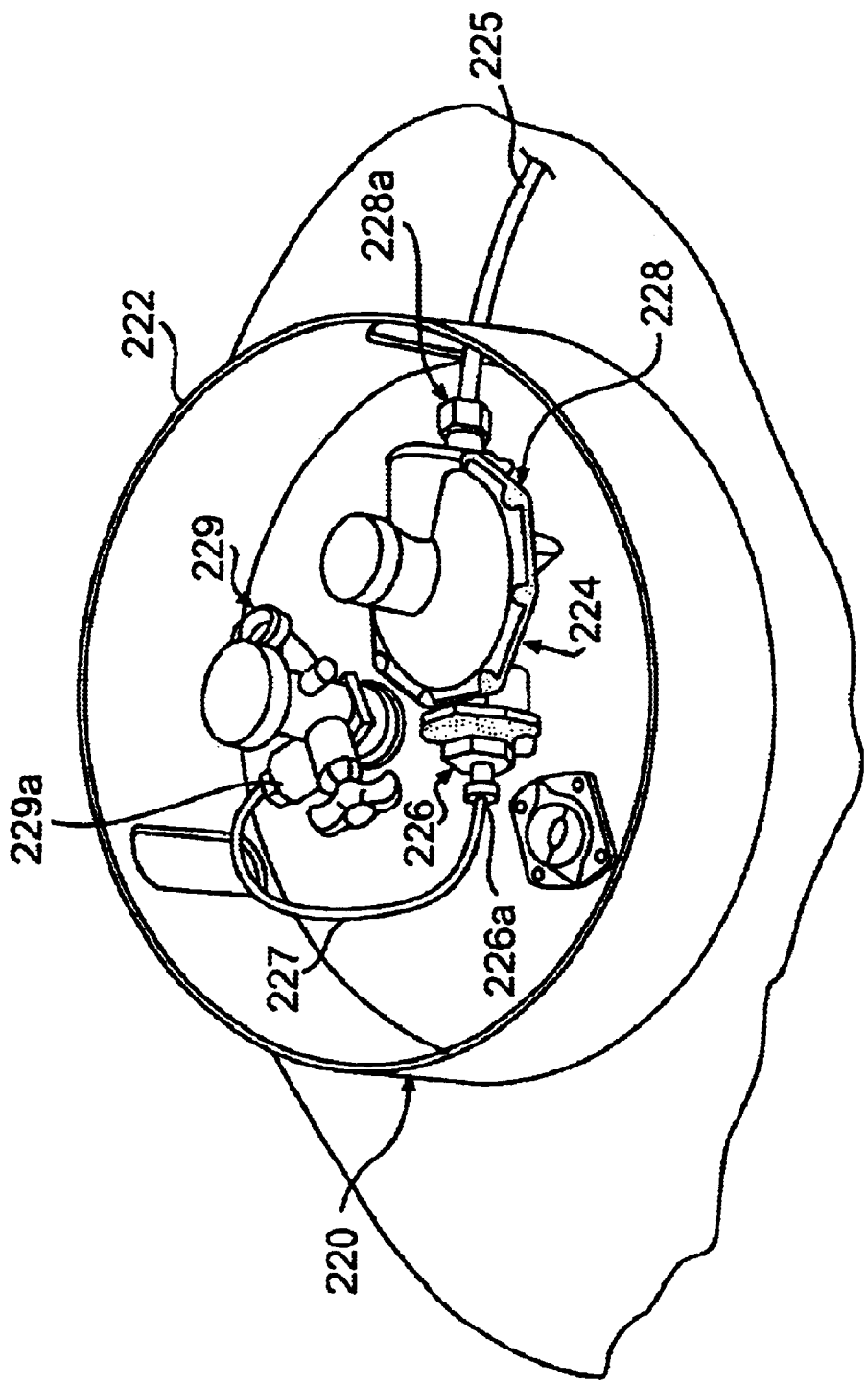
FIG. 18 is a perspective view of a conventional two stage regulator arrangement for a propane tank.

Before turning to consideration of two further embodiments of the valve assembly of the invention, some background considerations will be addressed in order to provide a better understanding of the applications of these embodiments. Referring to FIG. 18, there is shown a top portion of an LP cylinder including a conventional two stage regulator arrangement. The arrangement shown is generally similar to the single stage regulator arrangement of FIG. 2 and is of the type made by Sherwood LP Products, Series 920 and 921, which combines first stage and second stage regulation in one unit. However, it is to be understood that the embodiments of the invention about to be described are applicable to arrangements including both two stage and single stage regulators as well as to other, different arrangements.

In FIG. 18, the LP cylinder is denoted 220 and includes an upper protective ring element or annulus 222 which houses, i.e., surrounds, a two stage regulator 224 comprising a first stage 226 and a second stage 228. The second stage 228 includes a low pressure connection 228a which is connected to the service line 225. The first stage regulator 226 includes a high pressure connection 226a which is connected through a standard pigtail connection 227 to the downstream outlet 229a of a tank service valve 229.

Figure 19:
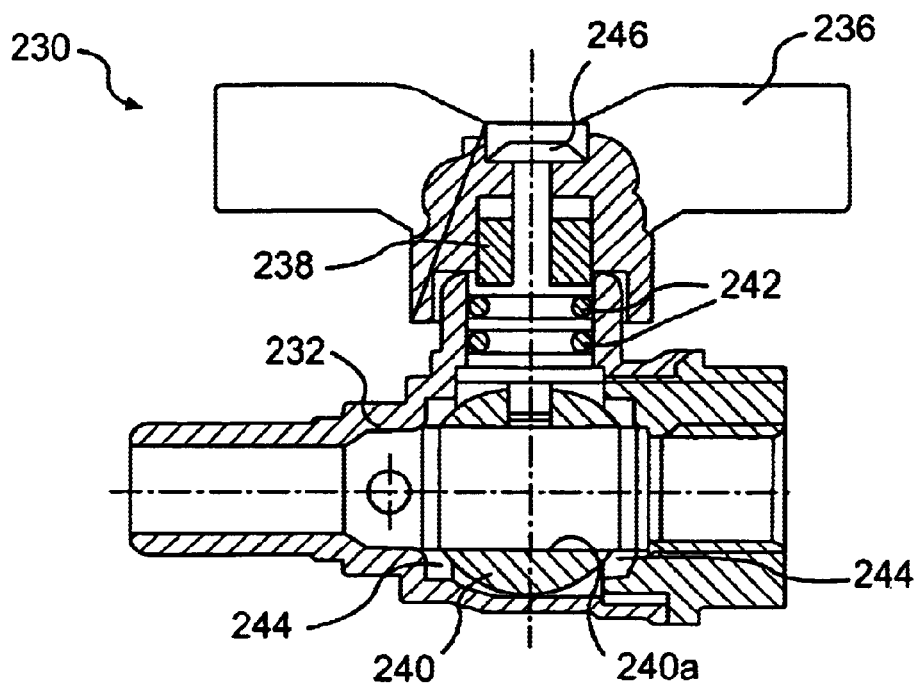
FIGS. 19 and 20 are a cross-sectional view and top plan view, respectively, of a valve unit employed in accordance with a further embodiment of the invention.
Figure 20:
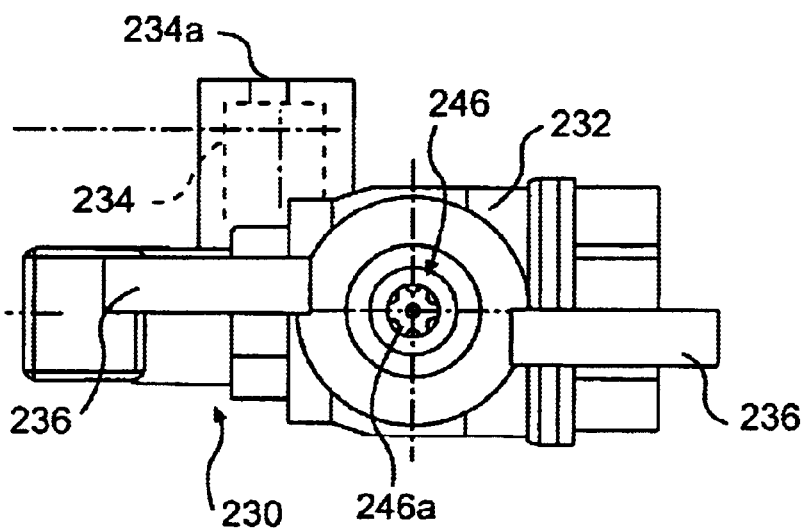
Figure 22:
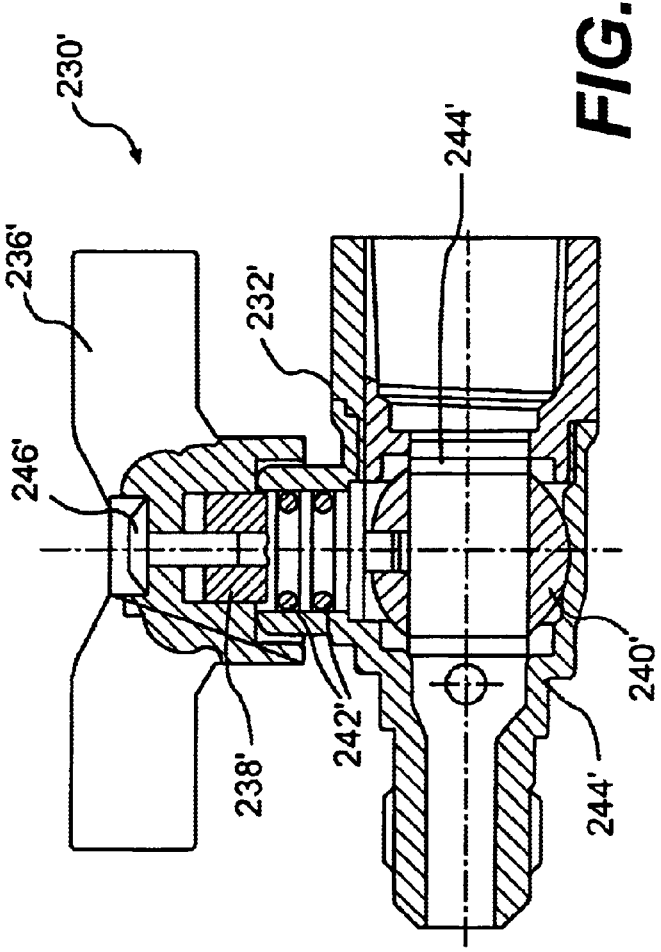
FIGS. 22 and 23 are a cross-sectional view and a top plan view, respectively, of a further valve unit employed in accordance with a further embodiment of the invention.
Figure 23:
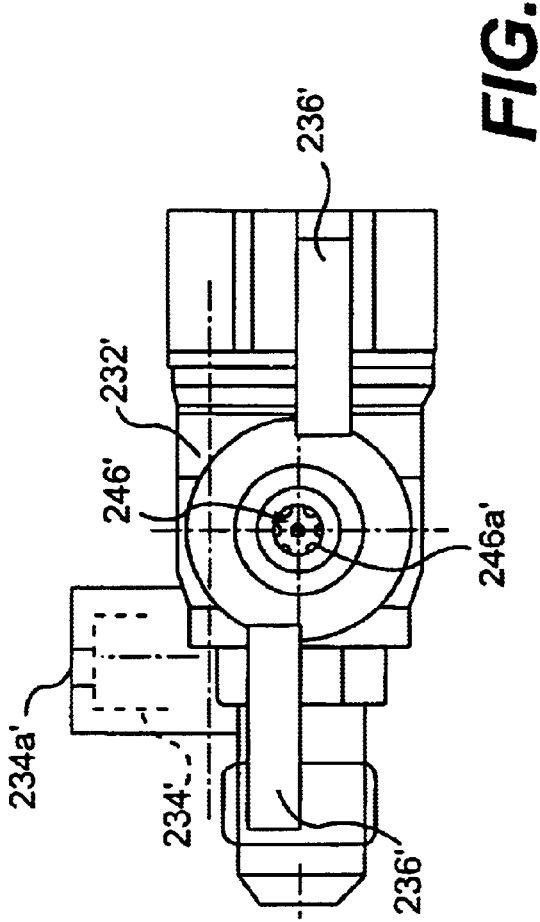

Referring to FIGS. 19 and 20, a "tank pressure" embodiment of this aspect of the invention is shown. Both this embodiment and that of FIGS. 22 and 23 are related to the embodiment of FIGS. 16 and 16(a) and are concerned with an improved flow control or shut-off valve which provides a number of important advantages. In both embodiments, the valve construction is itself a modified form of a conventional manual valve, e.g., the JOMAR® SYSTEM-3® manual valve, made by Jomar International Ltd. of Madison Heights, Mich. In the embodiment of FIGS. 19 and 20, the valve, which is generally denoted 230, includes valve body 232 including a side pressure tap 234 (see FIG. 20). A handle 236 is connected through a valve stem 238 (see FIG. 19) to a valve element or ball 240 which includes a central bore 240a and is shown in the open position thereof in FIG. 19. As shown in FIG. 19, a pair of O-rings 242 surround stem 238 and a pair of separate valve seats 244 are disposed on opposite sides of valve ball 240. A fixing or locking screw 246 connects handle 236 to valve stem 238 and enables locking of the valve 230 as described in more detail below. As shown in FIG. 19, locking or fixing screw 246 has, in the top thereof, a specially shaped tool receiving recess or opening 246a which is adapted to be engaged by a special tool (not shown) similar to an Allen wrench and including an end portion shaped to enter into recess or opening 246a and to enable turning of screw 246 to provide locking and unlocking thereof.

Figure 21:
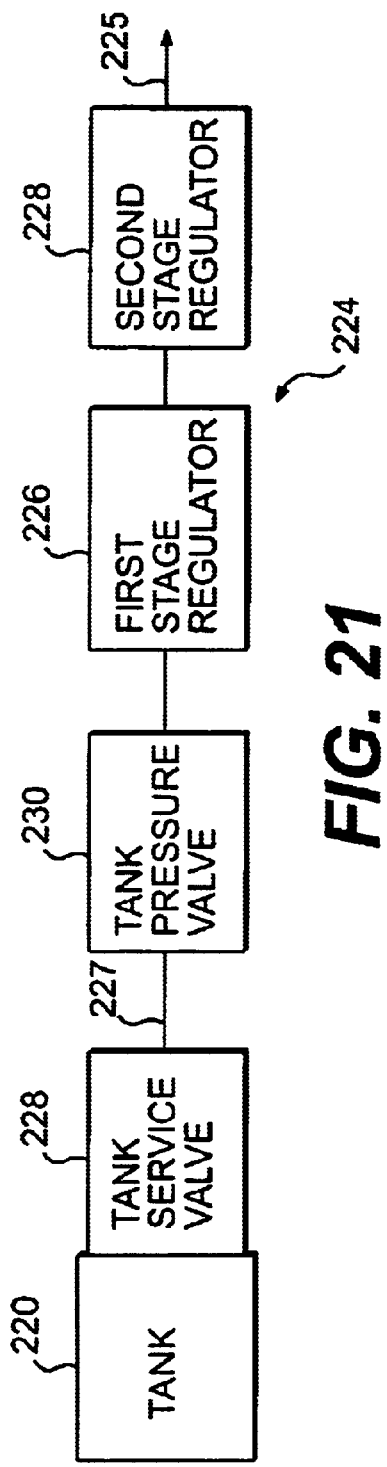
FIG. 21 is a block diagram of a propane system incorporating the value nit of FIGS. 19 and 20.

The valve 230 includes a male end connection 248 and a female end connection 250 and, in a preferred embodiment, the valve is a ¼" F-IPS×¼" M-IPS valve constructed to be connected to the tank-side ¼" F.NPT inlet of a first-stage or an integral two-stage regulator and to the tank service valve of the LP system by means of a "pigtail" with a ¼" M.NPT connector. This is illustrated schematically in FIG. 21 in which units corresponding to those of FIG. 18 are represented by labeled blocks and in which tank pressure valve 230 is connected to the first stage regulator 226 of regulator 224 and to tank service valve 229 for tank 220 by a pigtail connection 227.

As shown in FIG. 20, the side pressure tap 234, which in the exemplary embodiment under consideration is a ⅛" F.NPT side pressure tap, contains an orifice 234a of a size no greater than that of #54 (0.054 inch) orifice in order to meet the requirements of NFPA Publications 54 and 58 discussed above regarding "excess flow." Alternatively, a separate valve unit (not shown) can be used which corresponds to that described in U.S. Pat. No. 6,209,562, issued on Apr. 3, 2001, and which has a built-in #54 orifice. This commercial embodiment of the latter valve is the UL Listed valve identified as the Presto-Tap LDS 2000/RV. If, as illustrated in FIG. 20, the reduced flow orifice 234a is incorporated in the valve 230, a conventional connector valve, made by the assignee of this application and identified as the Presto-Tap LDS 2000/RV-L, can be used to provide access for a tank pressure gauge (not shown). In a preferred embodiment, the gauge used is the UL listed gauge identified as the Presto-Tap Ambient Temperature/300 psi (Model No. 6800) gauge. In general, the gauge is used to determine whether there is liquid in the tank (or enough pressure to support continued service) and/or to determine if there is a leak in the system. Further, as described above in connection with shut-off valve 162 of FIGS. 16 and 16(a) valve 230 can be used to enable repair, painting or other servicing of tank 220 without interrupting propane service.

As indicated above, valve 230 includes a special locking screw or security screw 246 which connects control ("open/close") handle 236 to valve stem 238. By using the aforementioned special tool (not shown) to loosen the screw 246, a LP dealer/driver or service technician can position the handle 236 so as to lock the handle in either the open or closed position thereof. By locking the handle 236 in the open position, inadvertent interruption of propane service (such as could occur, e.g., by a child turning the handle 236 to the closed position) can be prevented. Further, even where the valve 230 is locked in the open position, the tank service valve 229 can still be used to terminate propane service. On the other hand, valve 230 can be locked in the closed position by an authorized person after a problem in the system has been detected (e.g., a leaking tank service valve, a downstream leak or other system problem) so as to prevent someone (e.g., the homeowner) from restoring propane service before the problem is fixed.

It will be appreciated from the foregoing that the valve 230 enables LP dealer personnel to access tank pressure through port 234 and take pressure readings to determine if there is liquid in the tank (as in a true "out-of-gas" situation), to perform leak tests without "breaking" the system in order to install a T-block or other pressure testing device, then removing (de-installing) the testing device, and thereafter testing to make certain that a propane leak is not occurring at that point. The valve 230 also can be used to limit access to propane service to LP dealer personnel in possession of the special locking tool used to manipulate locking screw 246, thereby restricting access to the system by LP consumers not having the locking tool. As a consequence, the LP dealer has greater control over the safe and proper use of propane by his customer.

Referring to FIGS. 22 and 23, a "high pressure" valve unit 250 is shown. In this context, high pressure is defined as the pressure in the system after the tank pressure has been reduced by the first stage regulator to about 10 to 20 psi and prior to further reduction by the second stage regulator.

The flow control valve shown in FIGS. 22 and 23 is very similar in construction to the embodiment of FIG. 18 and 19 so that corresponding elements FIGS. 22 and 23 have been given the same reference numerals with a prime attached. The female and male connectors are different in size in the two embodiments and in the specific embodiment, the valve of FIGS. 22 and 23 is defined as a ½" F.NPT×½" F.NPT valve, although it will be understood that, more generally, the unit will have the appropriately sized connection for the appropriate system piping, i.e., ¾", 1" and so on. Although the side pressure tap 234' is shown as including a reduced size (#54 or smaller) orifice 234a', as in the previously described embodiment, such an orifice is not required as described below.

Figure 24:
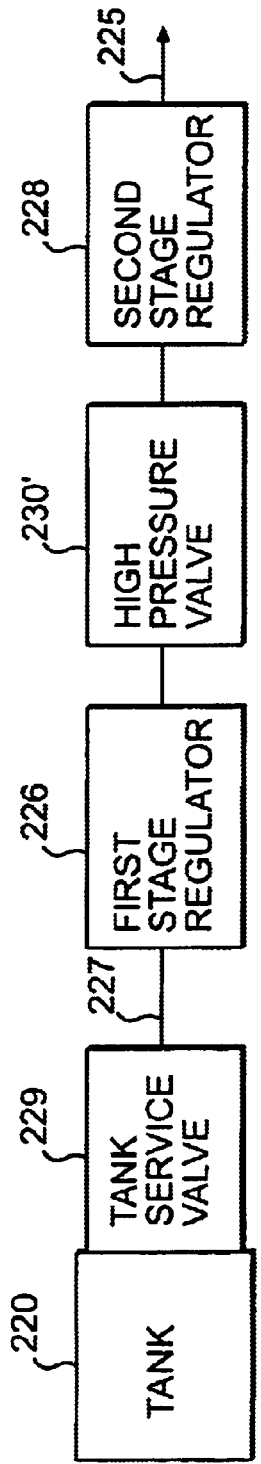
FIG. 24 is a block diagram of a propane system incorporating the valve unit of FIGS. 22 and 23.

As shown in FIG. 24, the valve 230' is installed in the piping (viz., ½" piping) upstream of the second stage regulator 228 outside the structure thereof, between the first stage regulator 226 and the second stage regulator 228. It will, of course, be appreciated that the two stages need not be mounted on the tank as shown in FIG. 18 and, in an important embodiment, are widely separated, with the second stage regulator 228 being located, e.g., at the outside wall of the house being serviced. Because "excess flow" safeguards required by NFPA Publications 54 and 58 are not required at the high pressure location of valve 230', the valve 230' need not include a restricted flow orifice, either built into pressure tap '234 or as provided by a separate valve connected to pressure tap '234 as described for valve 230.

At the high pressure location of valve 230', pressure readings can be taken using an industry standard 30 psi gauge (not shown) connected through the aforementioned valve (2000/RV or 2000/RV-L) and an adapter (e.g., a Presto-Tap Quick Adapter) with a hose barb attached to the flexible hose (as shown in U.S. Pat. No. 6,209,562), following the procedures outlined in NFPA Publications 54 and 58. If a leak has been detected, the source of the leak can be identified as either occurring inside or outside the structure being serviced and an authorized service technician is then called to correct the problem. Installation of valve 230' at this location also provides additional shut-off capability without the need for closing the tank service valve 232. Further, in situations wherein the propane system is servicing multiple structures or locations and separate valves corresponding to valve 230' are associated with each location, service to one location can be terminated by shutting off the corresponding valve 230', without affecting service to the other locations.

The locking screw 246' can be used in the manner described above to "lock" the valve in either the open or closed position, for the purposes previously outlined.

Although the invention has been described above in connection with a propane system, it is to be understood that the invention is also applicable to natural gas systems. The primary difference between propane and natural gas systems insofar as the invention is concerned is the size of the valve connections to the associated piping. In this regard, propane systems typically use ½", ¾" and 1" pipe and the valves are sized appropriately, while natural gas systems use 1" to 2" piping and thus large valves are required.

In accordance with a further important embodiment of the invention, a valve generally corresponding to that shown in FIGS. 19, 20 and 22, 23 is employed in a natural gas system, as shown schematically in FIG. 26. In general, such a valve would provide capabilities and advantages which are essentially the same as those described above for propane systems including the ability to perform leak tests and determine pressure readings without "breaking" the system in order to install a testing adapter or like device.

Figure 25:
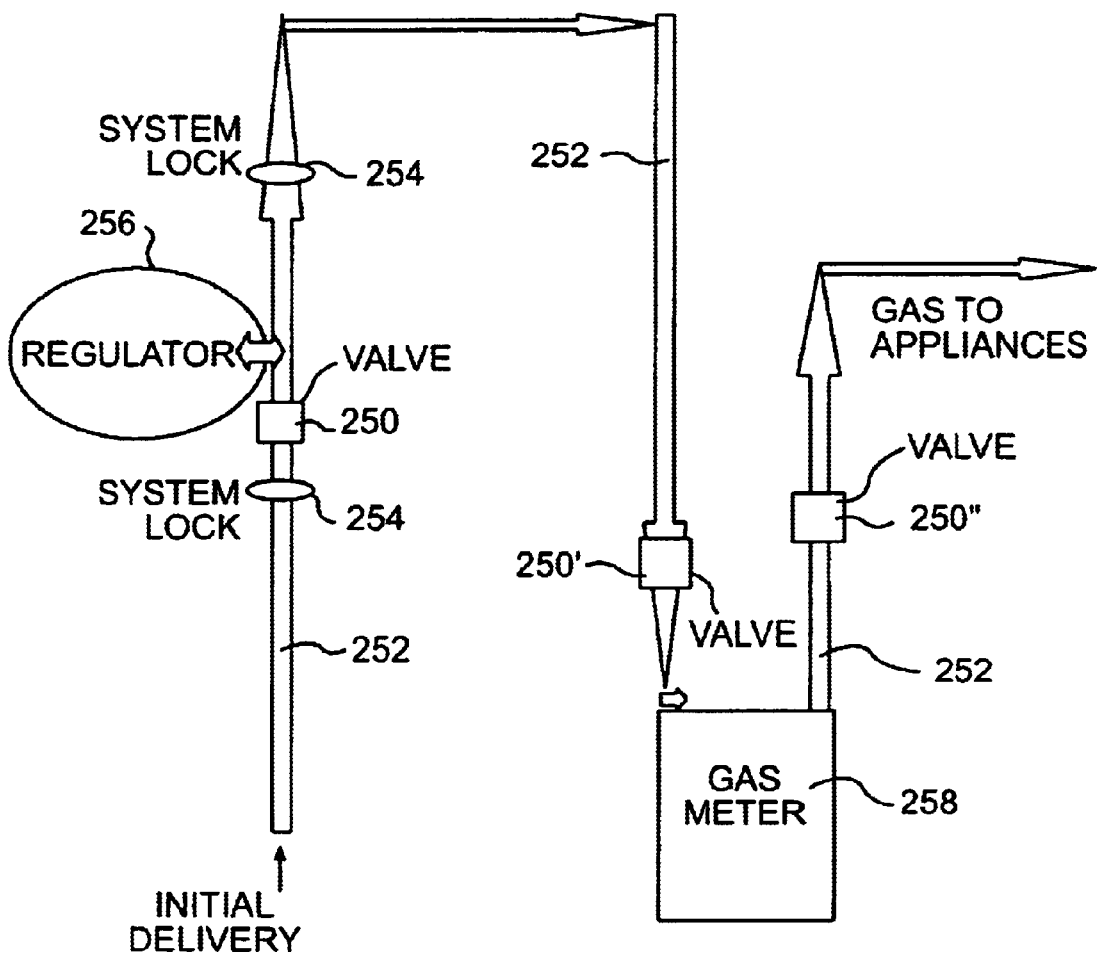
FIG. 25 is a schematic diagram of a natural gas delivery system incorporating valve units similar to those of FIGS. 19, 20 and 22, 23.

The valves used in FIG. 25 are generally denoted 250', 250" and 250''' and are preferably of the integrated shut-off type described above including a side pressure tap and a locking handle, as previously described. Because the valves are essentially the same as described above in connection with, e.g., FIGS. 19 and 20, the construction thereof will not be described again. The valves may or may not include a #54 or smaller orifice located at the side tap. As described above, in a preferred embodiment, the side tap is adapted to accept the Presto-tap "RV" or "RV-L" connectors mentioned above for affixing suitable testing and/or measuring devices to the system.

In FIG. 25, the system piping or service line is denoted 252 and the system includes system locks 254, a regulator 256 connected between the system locks 254 and a gas meter 250 provided in the system at the structure being serviced prior to, i.e., upstream of, the output connection of gas line 252 to the appliances to which gas is being supplied. As indicated above, FIG. 25 shows three valves 250, 250' and 250" connected in the system at three different locations. It will be understood that only a single valve may be employed and that two or more valves can be used depending on the desired ends to be achieved.

Valve 250 is located in the service line 252 prior to the regulator 256 and provides the ability to access, and document as required, the initial pipeline pressure delivered to the system.

Valve 250' is positioned after or downstream of the regulator 256 (and can, for example, be connected immediately after the regulator) and upstream of the meter 258, and enables measurement of the "delivery pressure" after the initial pressure has been reduced by the regulator (typically down to 7" W.C.). Valve 250' also enables service personnel to replace the regulator 256 without interrupting service.

Valve 250" is located downstream of the natural gas meter 258 prior to entry of the service line into the structure being serviced and, in addition to providing a further location for making pressure readings and determining the presence of leaks, the valve 250" permits replacement or calibration of either, or both, the regulator 256 and the meter 258. It is noted that multiple valves of different sizes providing different flow rates (BTU/Hr) can be employed to accommodate the flow requirements of the different appliances being serviced. Although not specifically illustrated, the valves could be located inside the structure at the appliance connections so as to determine the pressure delivered to the appliances. It is noted that these valves can be locked in closed position in the manner described above and only opened by qualified personnel so as to help ensure that the appropriate appliances are connected and the system is tested for proper flow and the absence of leaks.

More generally it will be noted that the use of the valve of the invention, including the "locking" function described above, i.e., the ability to lock the valve, is useful at all of the installation locations described above to restrict access to the system to qualified service personnel and to minimize the possibility of tampering with the valve.

Although the present invention has been described to specific exemplary embodiments thereof, it will be understood by those skilled in the art that variations and modifications can be effected in these exemplary embodiments without departing from the scope and spirit of the invention.

What is claimed is:

1. A liquid propane system including a propane tank, a tank service valve connected to the tank, a pressure regulator connected to the tank service valve, and a flow control valve device connected between said tank service valve and said pressure regulator, said flow control valve device including pressure tap means for enabling gauge measurement of tank pressure and including a flow restrictive orifice having a diameter of no greater than 0.054 inches.

2. A liquid propane system according to claim 1, wherein valve device includes shut-off valve unit and said pressure tap means comprising a pressure tap unit separate from said valve unit and connected thereto.

3. A liquid propane system according to claim 1, wherein said valve device comprises a shut-off valve unit including valve body and said pressure tap means comprises pressure tap port formed integrally with said valve body.

4. A liquid propane system according to claim 3, wherein said shut-off valve unit includes a valve operator having a open and closed positions and a locking element for selectively locking said valve operator in either of said positions.

5. A liquid propane system according to claim 4, wherein said valve operator comprises a valve handle, said valve unit further includes a valve stem and said locking element comprises a locking screw connecting said valve handle to said valve stem, said locking screw including a locking recess of a non-standard shape adapted to engage a locking tool including a screwdriver portion of a shape matching that of said locking recess.

6. A liquid propane system according to claim 3, wherein said flow restrictive orifice is formed in said pressure tap port.

7. A liquid propane system according to claim 3, wherein said flow restrictive orifice is formed in a separate component connected to said pressure tap port.

8. A liquid propane system according to claim 3, wherein said shut-off valve includes a valve operator including a closed position and a locking element for selectively locking said valve operator in said closed position.

9. A liquid propane system according to claim 3, wherein said shut-off valve includes a valve operator having a open position and a locking element for selectively locking said valve operator in said open position.

10. A liquid propane system including a propane tank, a tank service valve connected to the tank, a pressure regulator connected to the tank service valve and comprising a first regulator stage, a second regulator stage, and a connection between said first and second stages, and a flow control valve device connected in the connection between said first regulator stage and said second regulator stage, said flow control valve device including pressure tap means for enabling gauge measurement of pressure in the connection between said first and second regulator stages and including a flow restrictive orifice having a diameter of no greater than 0.054 inches.

11. A liquid propane system according to claim 10, wherein valve device includes shut-off valve unit and said pressure tap means comprising a pressure tap unit separate from and connected to said valve unit.

12. A liquid propane system according to claim 10, wherein said valve device comprises a shut-off valve unit including valve body and said pressure tap means comprises pressure tap port formed integrally with said valve body.

13. A liquid propane system according to claim 12, wherein said shut-off valve unit includes a valve operator having a open and closed positions and a locking element for selectively locking said valve operator in either of said positions.

14. A liquid propane system according to claim 13, wherein said valve operator comprises a valve handle, said valve unit further includes a valve stem and said locking element comprises a locking screw connecting said valve handle to said valve stem, said locking screw including a locking recess of a non-standard shape adapted to engage a locking tool including a screwdriver portion of a shape matching that of said locking recess.

15. A liquid propane system according to claim 12, wherein said flow restrictive orifice is formed in said pressure tap port.

16. A liquid propane system according to claim 12, wherein said flow restrictive orifice is formed in a separate component connected to said pressure tap port.

17. A liquid propane system according to claim 12, wherein said shut-off valve includes a valve operator including a closed position and a locking element for selectively locking said valve operator in said closed position.

18. A liquid propane system according to claim 12, wherein said shut-off valve includes a valve operator having a open position and a locking element for selectively locking said valve operator in said open position.

19. A kit as claimed in claim 8, wherein said pressure gauge comprises an indicating needle and further includes a pressure scale and an ambient temperature scale calibrated relative to said pressure scale so that the position of said needle that provides a reading of gauge pressure on said pressure scale also provides a reading of the corresponding minimum ambient temperature on said ambient temperature scale.

20. A kit for use in a propane tank system for enabling detection of escaping gas, the tank system including a propane tank, a tank service valve connected to the tank, and at least one regulator connected to the tank service valve, as well as at least one pressure port for enabling pressure in the system to be measured at the location of the port, and said kit comprising:

a valve assembly for connection, in use, to a selected pressure port in the tank system, said valve assembly comprising: a valve housing including a central bore therein and an end connection for providing connection of the valve housing to the pressure port, and a valve unit received in the central bore of said valve housing and including a valve operator actuable to open a fluid connection to the pressure port when said valve assembly is connected to the pressure port; and a separate pressure gauge adapted to be carried by tank service personnel and including a connector for providing connection of said pressure gauge to said valve assembly when said valve assembly is connected to said pressure port, and for, when connected to said valve assembly, providing actuation of said valve operator so that, in use with the tank service valve open, the gauge provides a reading of the pressure at the pressure port and, in use with the system pressurized and the tank service valve closed, the gauge provides an indication of the presence of a leak or open line in the propane tank system.

21. A pressure gauge device for use in a propane tank system, including a propane tank and a tank service valve, for enabling detection of propane escaping the propane tank system, said pressure gauge device comprising a pressure gauge including a connector for providing connection to a valve assembly, including a valve operator, connected in the propane tank system, and for, when connected to the valve assembly, providing actuation of the valve operator so that, in use with the tank service valve open, the gauge provides a reading of the pressure in the propane tank system at the valve assembly and, in use with the propane system pressurized and the tank service valve closed, the gauge provides an indication of the presence of a leak or open line in the propane tank system, said pressure gauge further comprising an indicating needle, a pressure scale, and an ambient temperature scale calibrated relative to said pressure scale so that the position of said needle that provides a reading of gauge pressure on said pressure scale also provides a reading of the corresponding minimum ambient temperature on said ambient temperature scale.

* * * * *